United States Patent
Sakamoto

(10) Patent No.: US 8,456,746 B2
(45) Date of Patent: Jun. 4, 2013

(54) ZOOM LENS AND IMAGE PICKUP APPARATUS INCLUDING THE SAME

(75) Inventor: Masaru Sakamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/407,297

(22) Filed: Feb. 28, 2012

(65) Prior Publication Data

US 2012/0224269 A1   Sep. 6, 2012

(30) Foreign Application Priority Data

Mar. 4, 2011   (JP) .................................. 2011-047422

(51) Int. Cl.
*G02B 15/02* (2006.01)
*G02B 15/14* (2006.01)

(52) U.S. Cl.
USPC ............................. 359/674; 359/684; 359/688

(58) Field of Classification Search
USPC ................ 359/672, 674, 676, 683, 684, 686, 359/688
See application file for complete search history.

(56) References Cited

U.S. PATENT DOCUMENTS

| 5,966,246 | A | 10/1999 | Yoshikawa |
| 6,560,016 | B2 | 5/2003 | Usui et al. |
| 7,057,827 | B2 * | 6/2006 | Wakazono ................. 359/684 |

* cited by examiner

*Primary Examiner* — Jack Dinh

(74) *Attorney, Agent, or Firm* — Canon U.S.A., Inc., IP Division

(57) ABSTRACT

A zoom lens includes, in order from an object side to an image side, a first lens unit having a positive refractive power, which does not move for zooming, a second lens unit having a negative refractive power, which moves during zooming, a third lens unit having a negative refractive power, which moves during zooming, an aperture stop, and a fourth lens unit having a positive refractive power, which does not move for zooming. The fourth lens unit includes a first lens sub-unit, a focal length conversion optical system configured to be inserted into or removed from an optical path, and a second lens sub-unit. A focal length of the second lens sub-unit, a distance from the aperture stop to a lens surface at the most object side of the second lens sub-unit, and an F-number of the entire zoom lens at a wide-angle end are appropriately set.

7 Claims, 17 Drawing Sheets

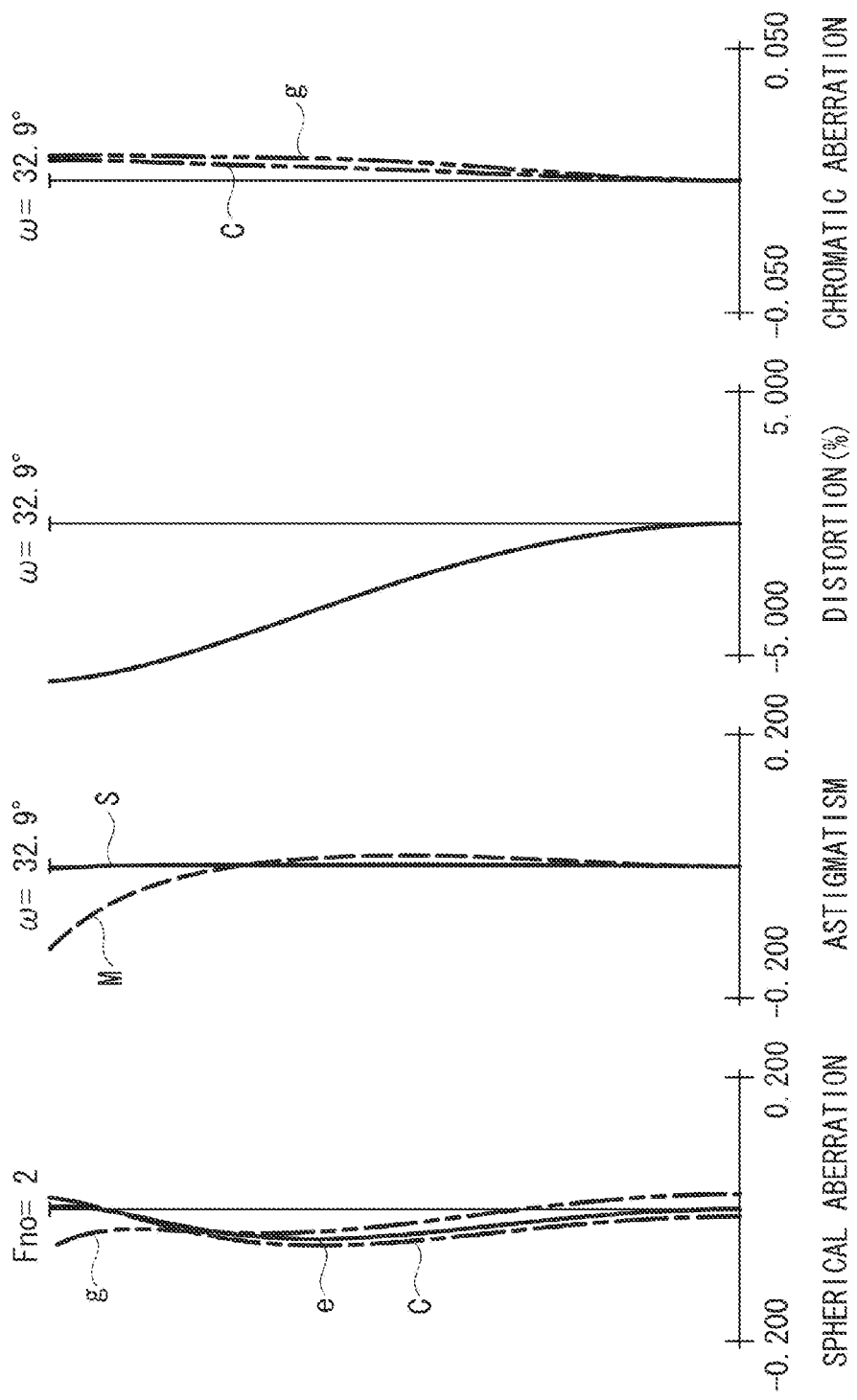

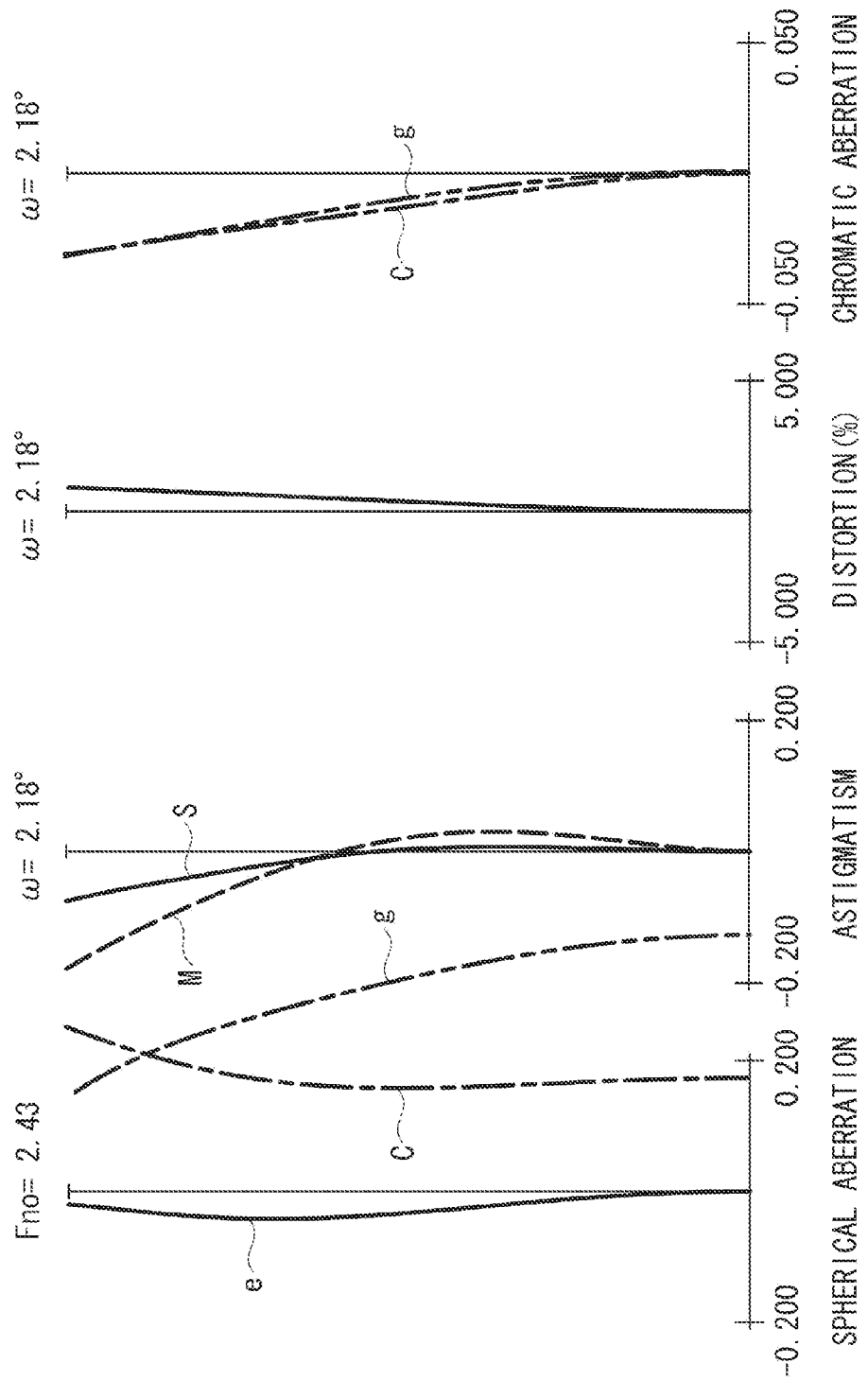

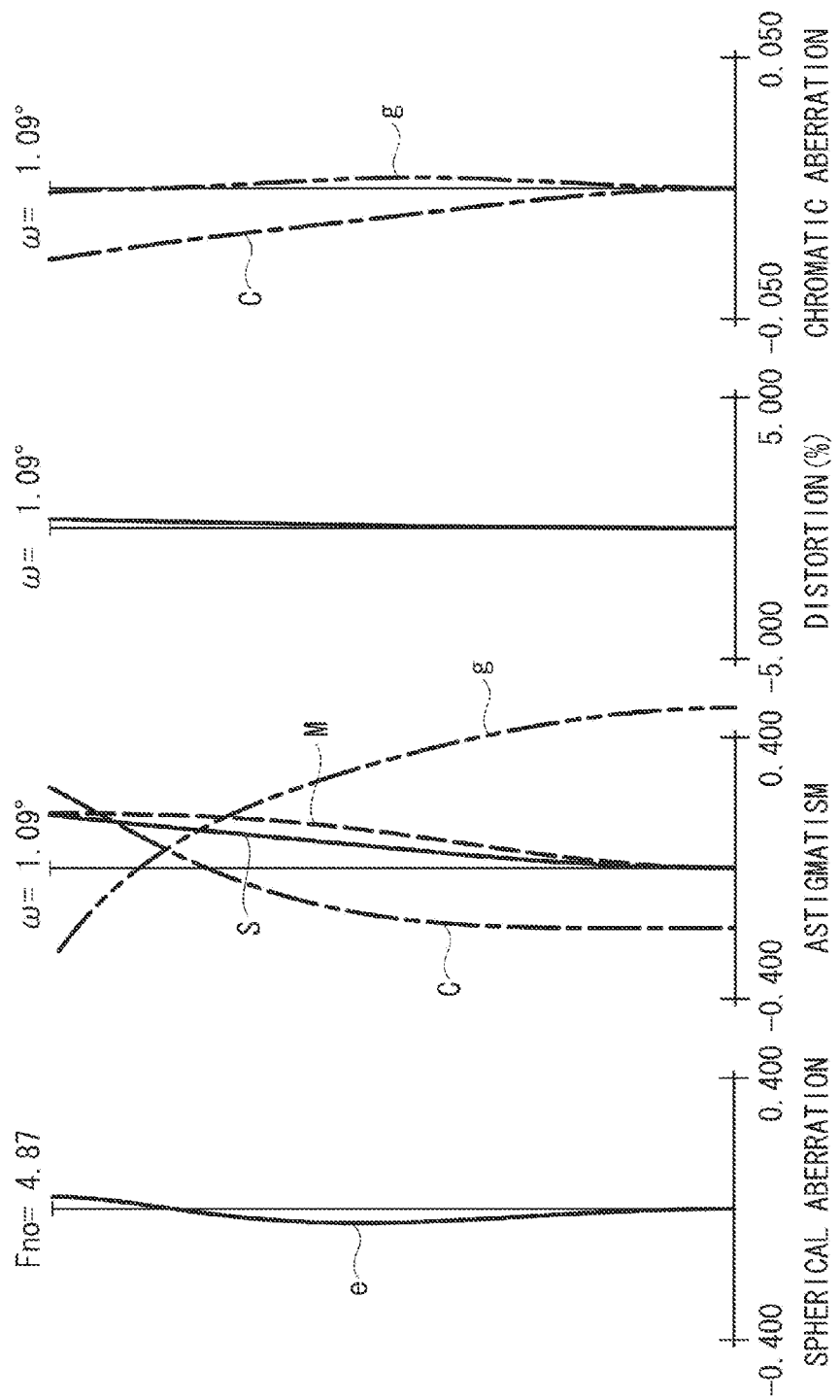

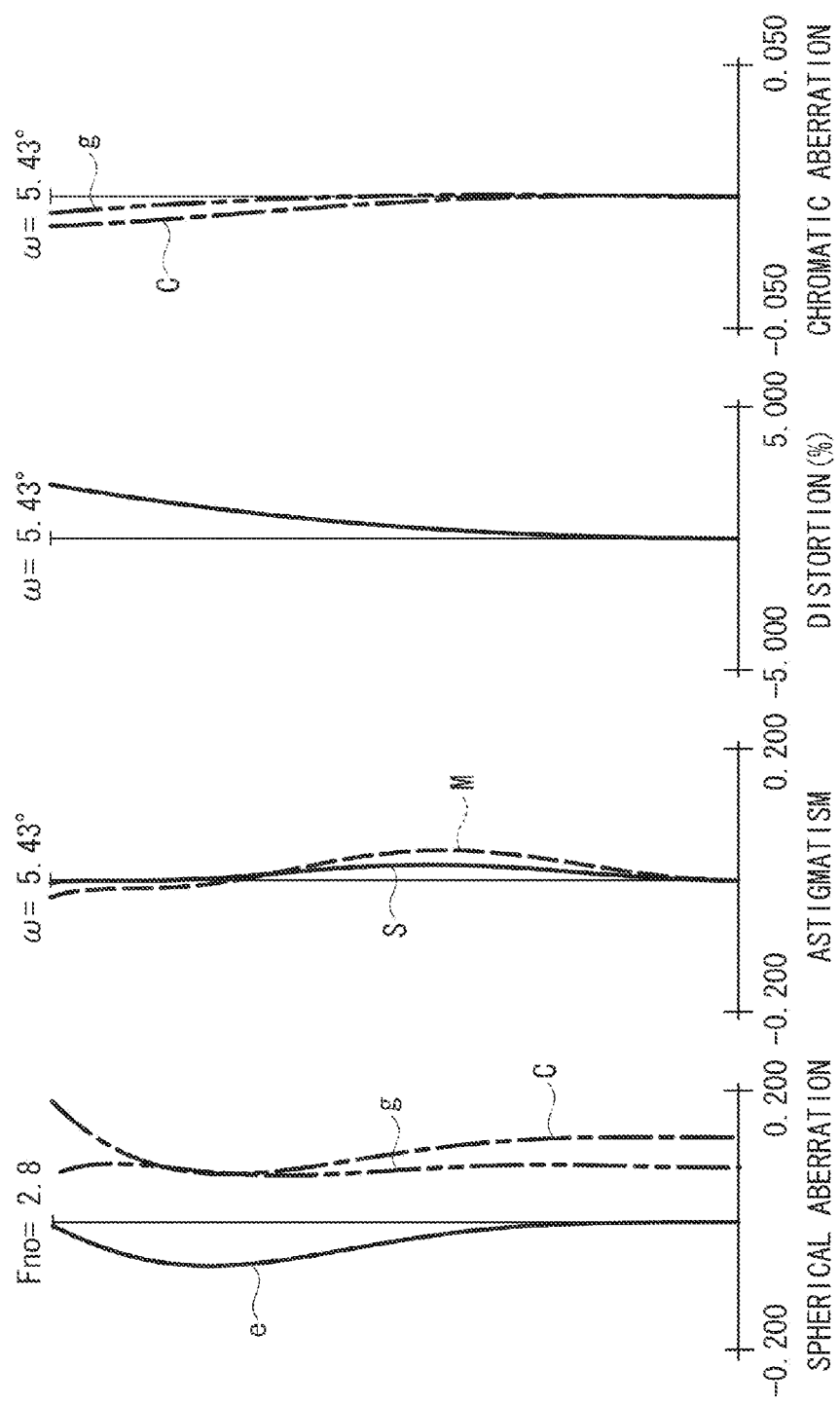

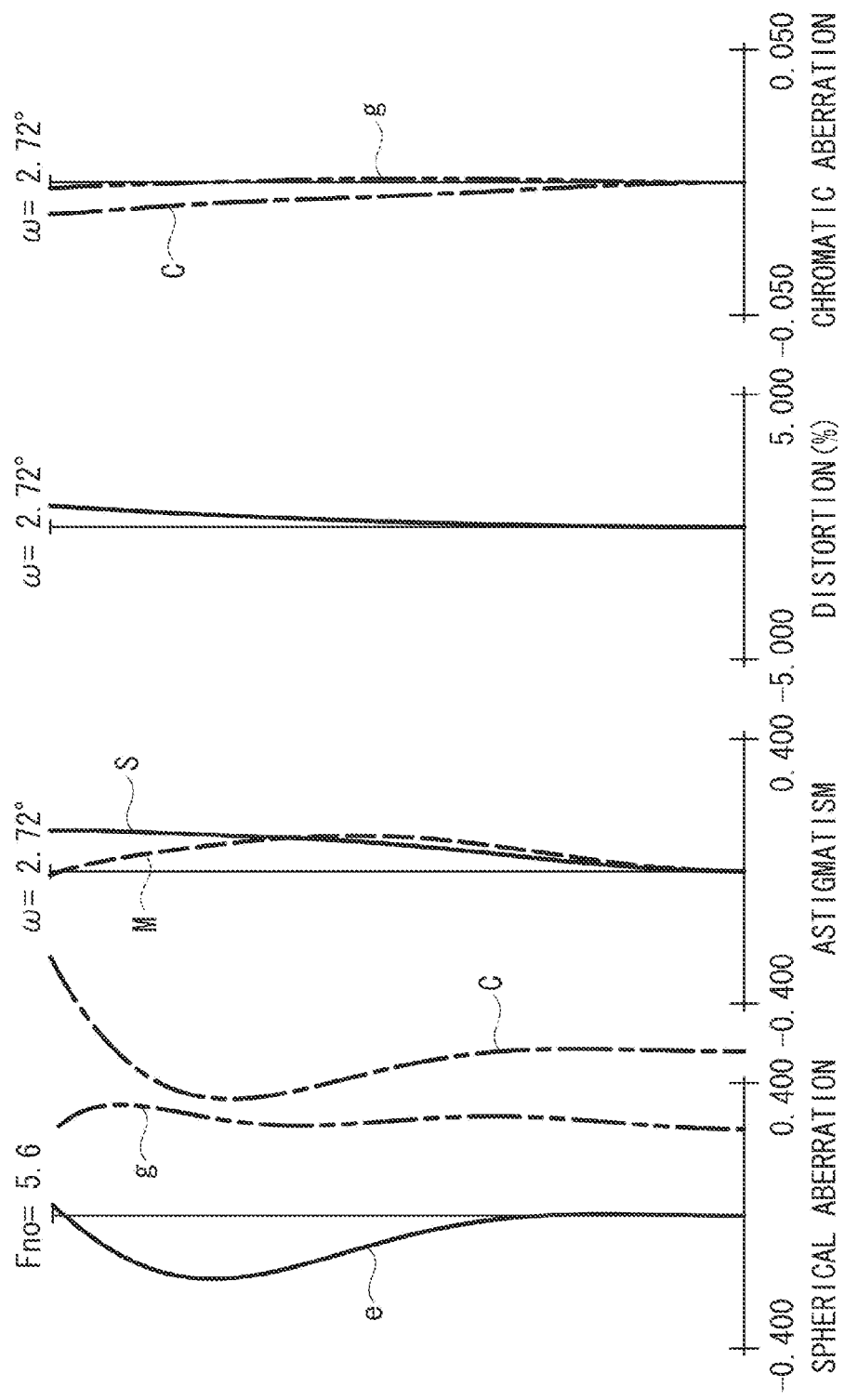

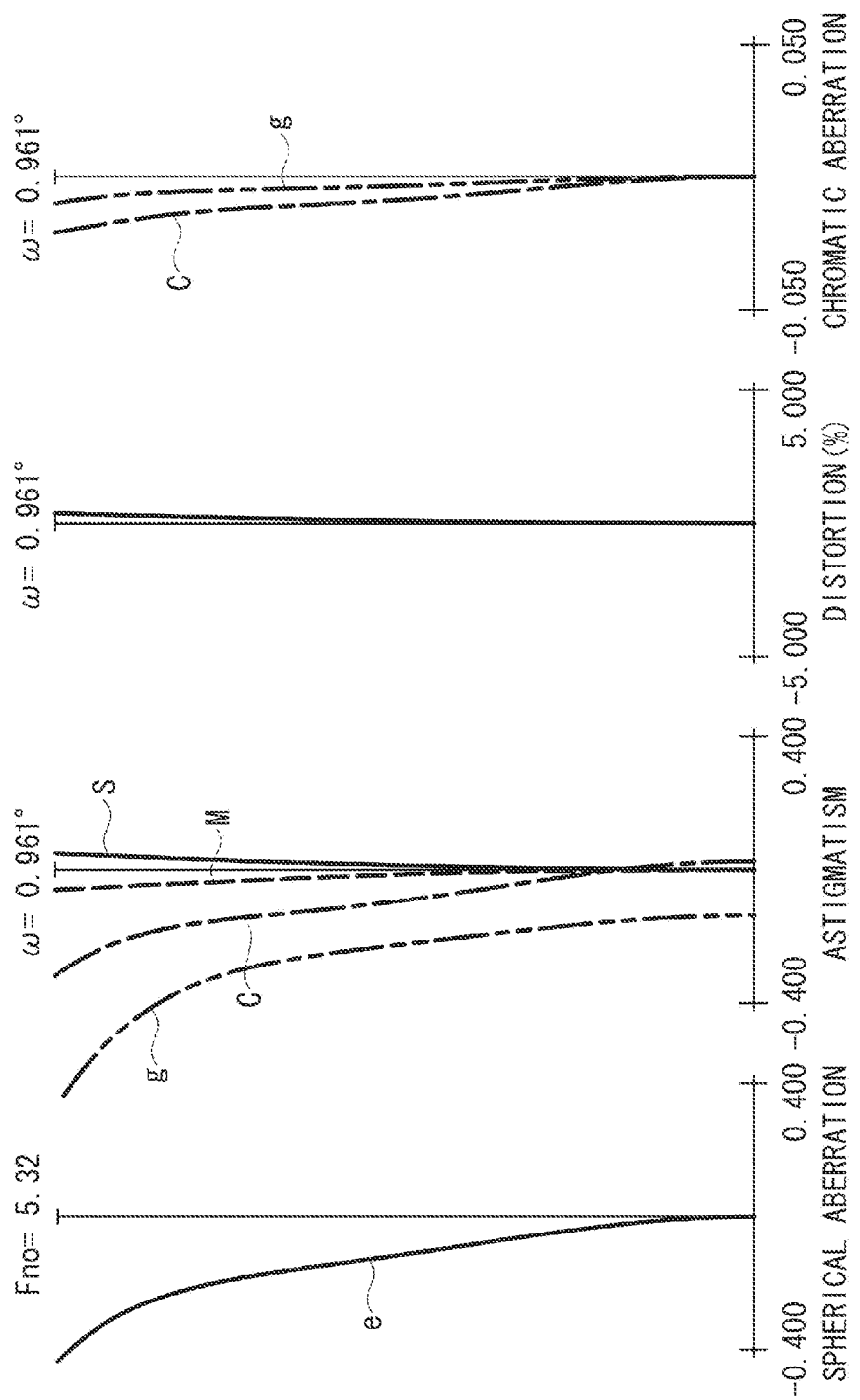

ZOOM LENS AND IMAGE PICKUP APPARATUS INCLUDING THE SAME

BACKGROUND OF THE INVENTION

1. Field of the Invention

The present invention relates to a zoom lens and an image pickup apparatus equipped with a zoom lens; the zoom lens may be suitable for use in a broadcasting television (TV) camera, a video camera, a digital still camera, a silver-halide film camera, or the like.

2. Description of the Related Art

A photographic optical system of an image pickup apparatus of a television camera or the like, typically includes a zoom lens in which high zoom ratio and high optical performance are desired. As a method of achieving a high zoom ratio, an internal extender method has been known. In the internal extender method, a focal length range of an entire zoom lens is displaced toward a long focal length side by inserting a focal length conversion optical system (extender) in apart of a relay unit which constitutes the zoom lens and which is stationary during zooming.

For example, U.S. Pat. No. 6,560,016 and U.S. Pat. No. 5,966,246 discuss a zoom lens which includes a first lens unit for focusing, a second lens unit for variation of magnification, a third lens unit for compensating variation of an image plane caused by the variation of magnification, and a fourth lens unit (relay unit) for image formation including a focal length conversion optical system. In the zoom lens discussed in U.S. Pat. No. 6,560,016 and U.S. Pat. No. 5,966,246, the fourth lens unit includes, in order from an object side to an image side, a first lens sub-unit, a focal length conversion optical system configured to be inserted into and removed from an optical path, and a second lens sub-unit. The focal length conversion optical system is inserted into an optical path so that the focal length range of the entire zoom lens is widened to have a longer focal length.

In an image pickup apparatus of a television camera or the like, a color image is obtained using a color separation optical system located on an image side. In order to obtain a satisfactory color image with small white shading over the entire image plane, it is important to control the incidence angle of a principal ray entering an image sensor to be substantially perpendicular over the entire image plane. To that end, the principal rays incident on the image sensor are collimated to be parallel to the optical axis over the entire image plane. This key property known as telecentricity can be obtained by careful design of multi-element lenses. Depending upon the optical spaces in which the principal rays exhibit this behavior, telecentricity may be classified into image-side, object-side, or dual telecentricity. A remarkable characteristic of telecentricity is constant magnification regardless of image and/or object location. For example, image-side telecentricity occurs when the system stop is placed at the image plane (rear focal plane) of the lens, which results in an exit pupil location at infinity. In this manner, a shift in the image plane does not affect image magnification. The same concept applies to object-side telecentricity.

Therefore, it is advantageous to configure a zoom lens to be in an image-side telecentric relation such that the position of an exit pupil is located as far away as possible from an image plane. In this manner, the same relation should be satisfied when a focal length conversion optical system is inserted into a relay unit to displace the focal length of the entire zoom lens toward a long focal length side. However, even when the position of an exit pupil is far away from an image plane, and favorable telecentric properties are obtained before the focal length conversion optical system is inserted into the optical path of the relay unit, if the position of the exit pupil becomes closer to the image plane when the focal length conversion optical system is inserted, color shading (in particular white shading) occurs, and the quality of a color image deteriorates.

In order to obtain a satisfactory color image with small white shading before and after the focal length conversion optical system is inserted into the relay unit, it is important to appropriately configure the lens configuration of the relay unit so that telecentricity is accurately maintained. Moreover, in order to realize miniaturization of the relay unit, it is important to appropriately set an F-number of the entire zoom lens.

SUMMARY OF THE INVENTION

According to an aspect of the present invention, a zoom lens includes, in order from an object side to an image side, a first lens unit having a positive refractive power, which does not move for zooming, a second lens unit having a negative refractive power, which moves during zooming, a third lens unit having a negative refractive power, which moves during zooming, an aperture stop, and a fourth lens unit having a positive refractive power, which does not move for zooming, wherein the fourth lens unit includes a first lens sub-unit, a focal length conversion optical system configured to be inserted into or removed from an optical path, and a second lens sub-unit, and wherein the following conditions are satisfied:

$$1.04 < f42/D < 1.25$$

$$Fno \leq 2.0$$

where f42 is a focal length of the second lens sub-unit, D is a distance from the aperture stop to a lens surface at the most object side of the second lens sub-unit, and Fno is an F-number of the entire zoom lens at a wide-angle end when the focal length conversion optical system is removed from the optical path.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention. As used herein, a plane where an object to be imaged is located will be referred to as an "object plane", and a plane where an image of the object is formed will be referred to as an "image plane". When considering an entire image pickup apparatus that includes a zoom lens and an image pickup element, the image plane corresponds to a plane located at the back focal plane of the zoom lens. Incidentally, the side of a lens where the object to be imaged is placed is interchangeably referred to as the "object-plane side", "object side", or "front side" of the lens; and the side of the lens where the image is formed is interchangeably referred to as the "image-plane side", "image side" or "back side" of the lens.

FIGS. 2A and 2B are longitudinal aberration diagrams of the zoom lens at a wide-angle end and a telephoto end, respectively, according to the first exemplary embodiment.

FIGS. 3A and 3B are longitudinal aberration diagrams of the zoom lens at a wide-angle end and a telephoto end, respectively, according to the first exemplary embodiment, when a focal length conversion optical system is inserted in an optical path.

FIGS. 5A and 5B are longitudinal aberration diagrams of the zoom lens at a wide-angle end and a telephoto end, respectively, according to the second exemplary embodiment.

FIGS. 6A and 6B are longitudinal aberration diagrams of the zoom lens at a wide-angle end and a telephoto end, respectively, according to the second exemplary embodiment, when a focal length conversion optical system is inserted in an optical path.

FIGS. 9A and 9B are longitudinal aberration diagrams of the zoom lens at a wide-angle end and a telephoto end, respectively, according to the third exemplary embodiment, when a focal length conversion optical system is inserted in an optical path.

DESCRIPTION OF THE EMBODIMENTS

Various exemplary embodiments, features, and aspects of the invention will be described in detail below with reference to the drawings.

The present invention is directed to a zoom lens which makes it easy to obtain a favorable color image with small white shading before and after a focal length conversion optical system is inserted into an optical path, and to an image pickup apparatus including the same.

A zoom lens according to an exemplary embodiment of the present invention includes, in order from an object side to an image side, a first lens unit having a positive refractive power, which does not move (is stationary) for zooming, a second lens unit having a negative refractive power, which moves during zooming, and a third lens unit having a negative refractive power, which moves during zooming (which compensates for variation of an image plane during zooming). The zoom lens further includes an aperture stop SP which adjusts the quantity of light passing therethrough, and a fourth lens unit having a positive refractive power, which does not move (is stationary) for zooming.

Figure 1:
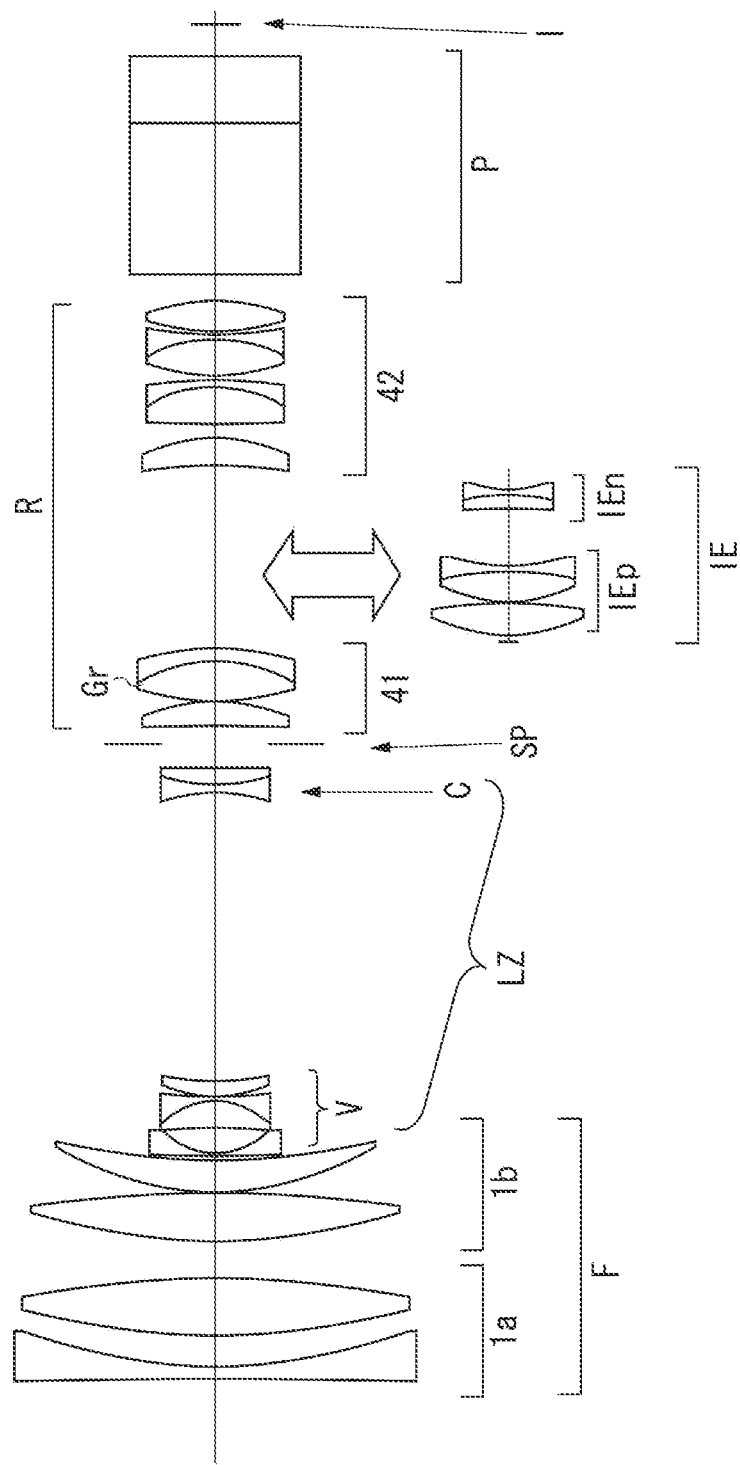
FIG. 1 is a lens cross-sectional view at a wide-angle end of a zoom lens according to a first exemplary embodiment of the present invention.
Figure 3A:
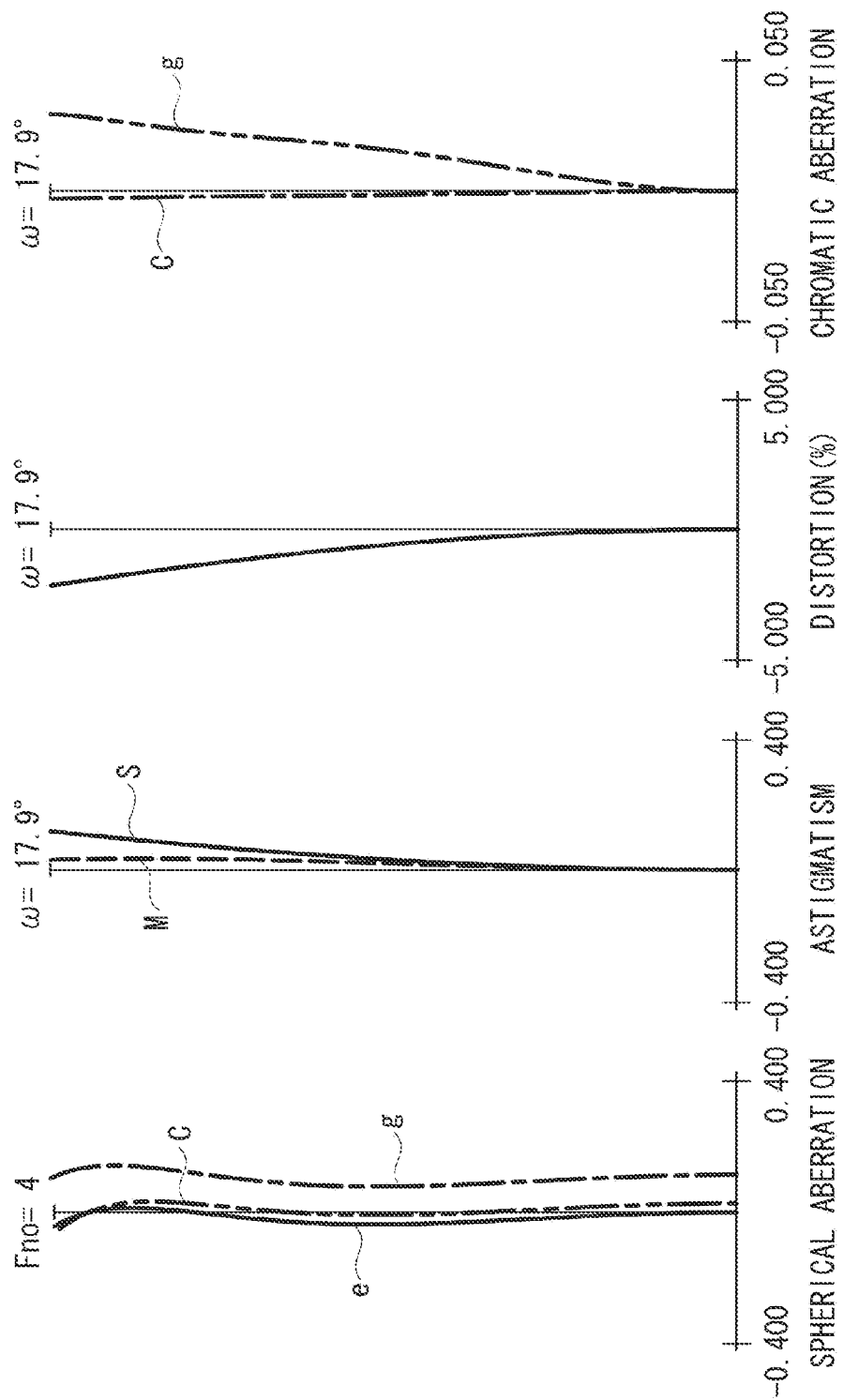
Figure 4:
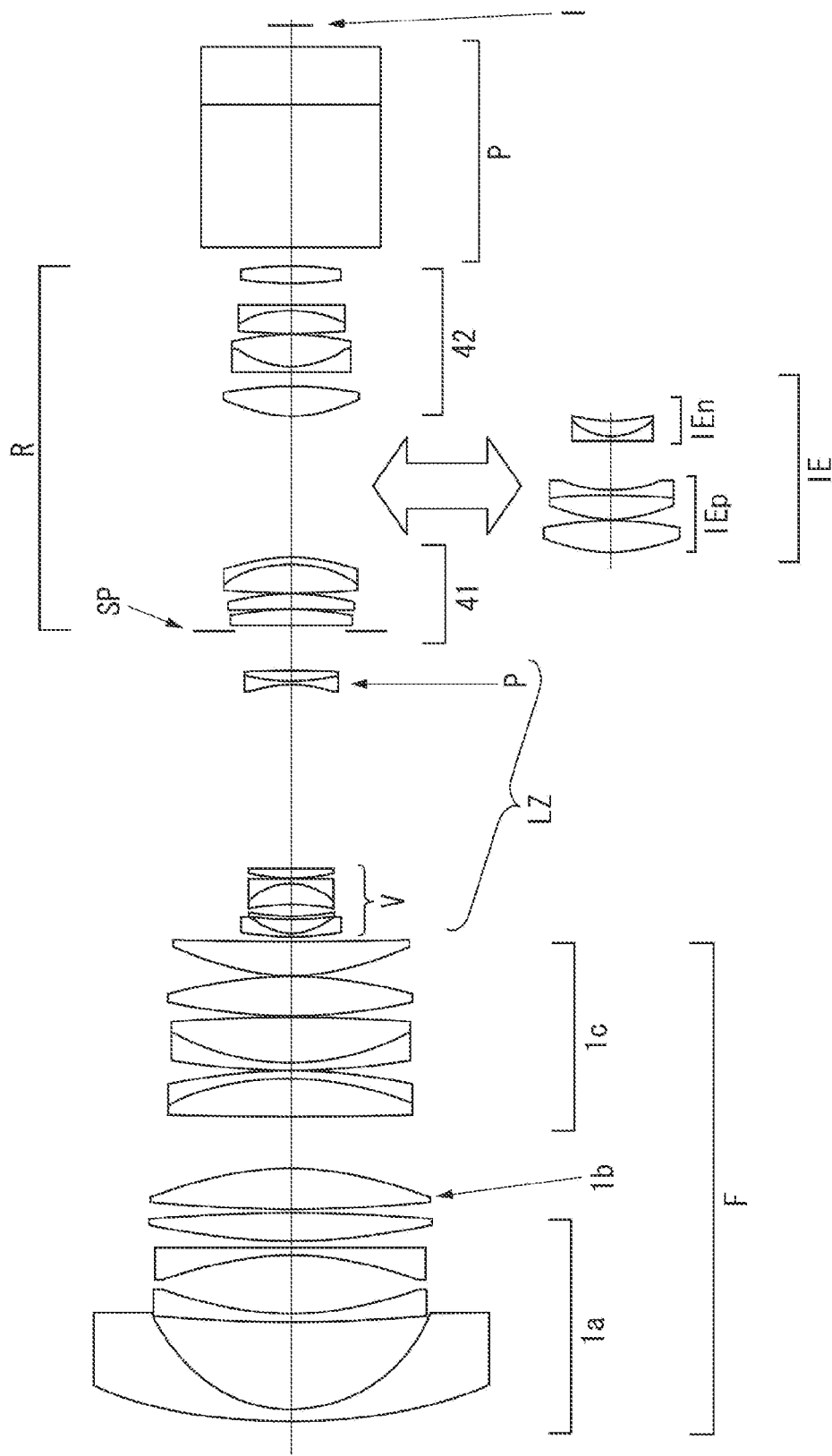
FIG. 4 is a lens cross-sectional view at a wide-angle end of a zoom lens according to a second exemplary embodiment of the present invention.
Figure 5A:
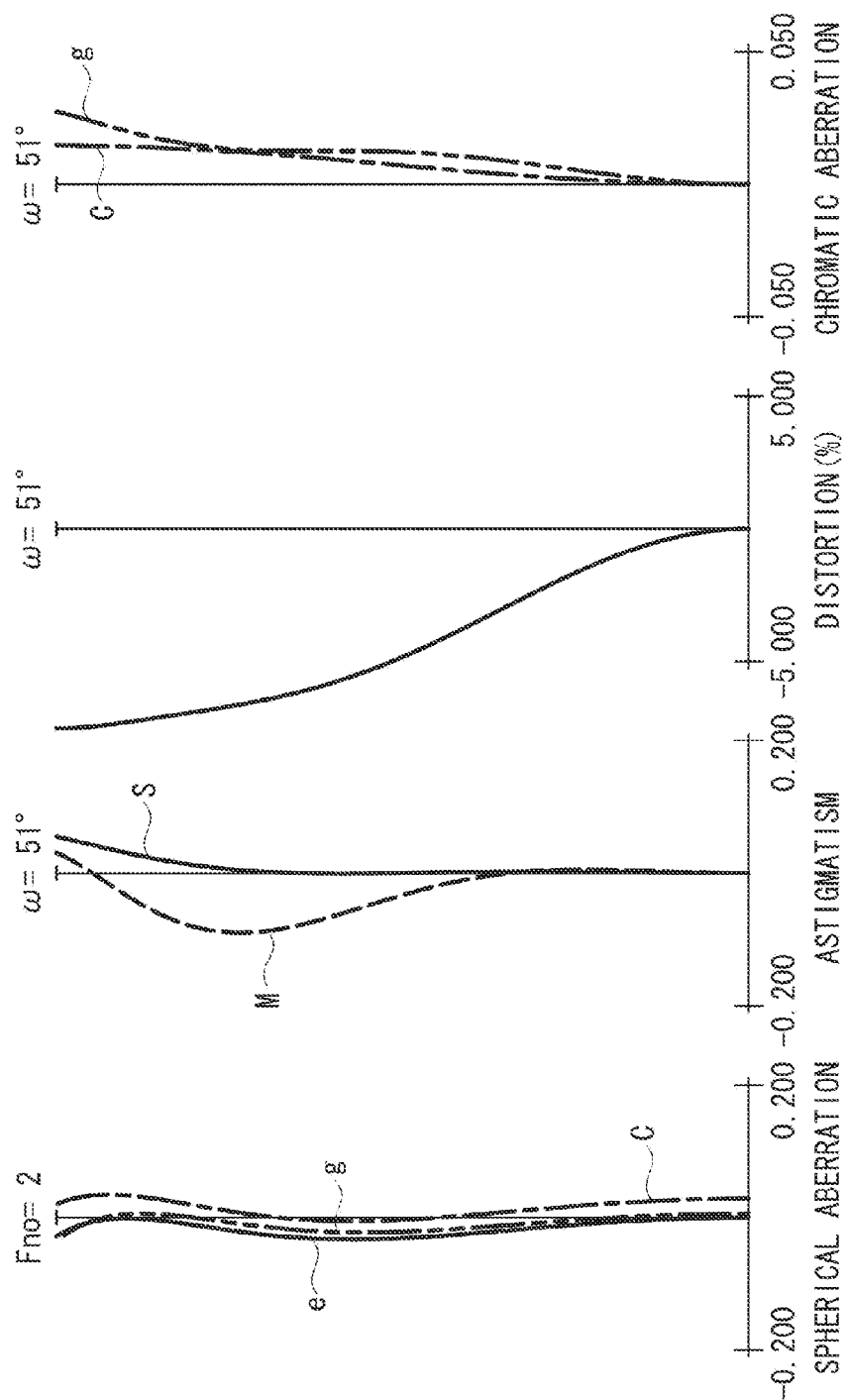
Figure 6A:
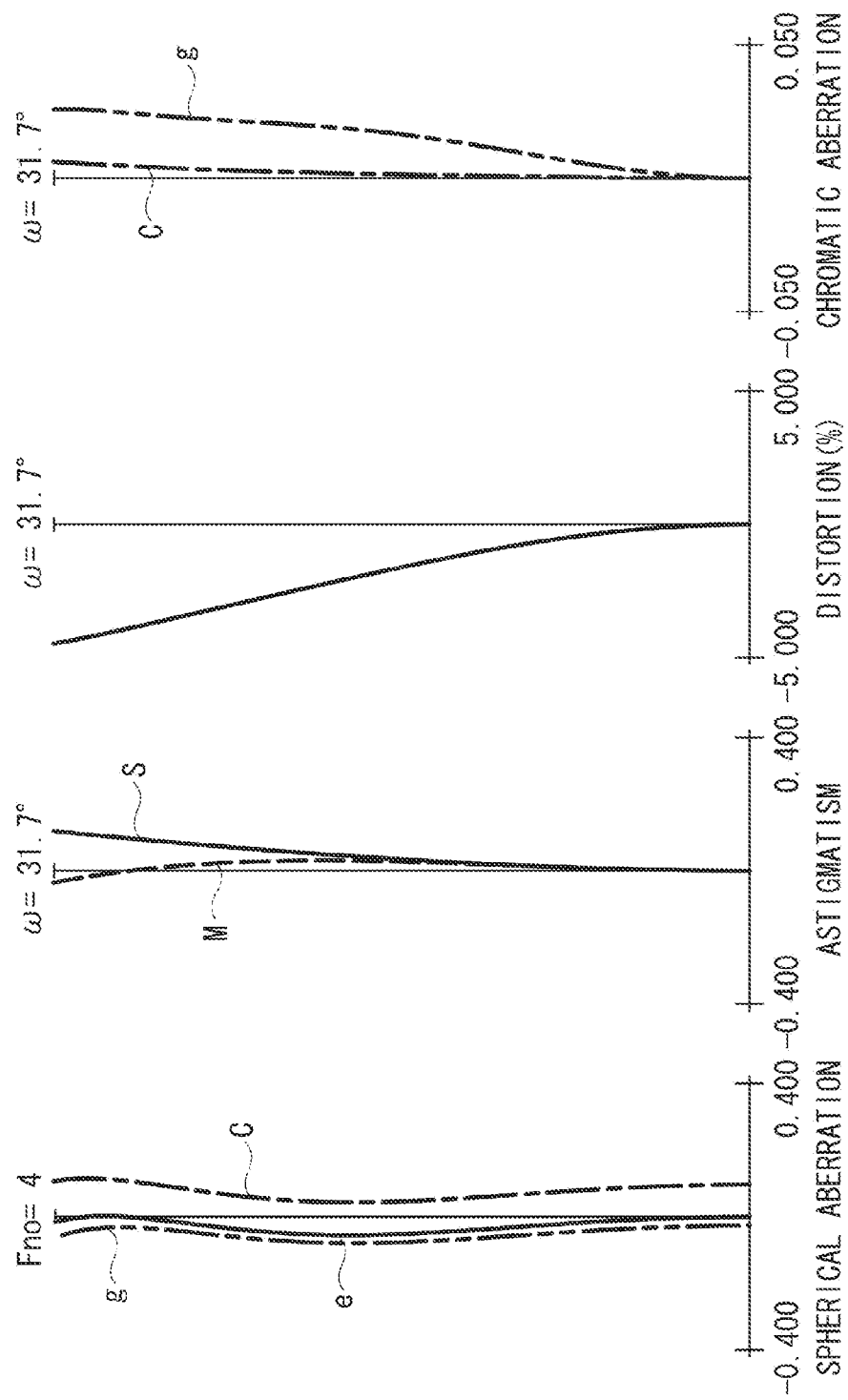

FIG. 1 is a lens cross-sectional view at a wide-angle end of a zoom lens according to a first exemplary embodiment of the present invention. FIGS. 2A and 2B are longitudinal aberration diagrams of the zoom lens at a wide-angle end and a telephoto end, respectively, according to the first exemplary embodiment. FIGS. 3A and 3B are longitudinal aberration diagrams of the zoom lens at a wide-angle end and a telephoto end, respectively, according to the first exemplary embodiment, when a focal length conversion optical system is inserted in an optical path. FIG. 4 is a lens cross-sectional view at a wide-angle end of a zoom lens according to a second exemplary embodiment of the present invention. FIGS. 5A and 5B are longitudinal aberration diagrams of the zoom lens at a wide-angle end and a telephoto end, respectively, according to the second exemplary embodiments. FIGS. 6A and 6B are longitudinal aberration diagrams of the zoom lens at a wide-angle end and a telephoto end, respectively, according to the second exemplary embodiment, when a focal length conversion optical system is inserted in an optical path.

Figure 7:
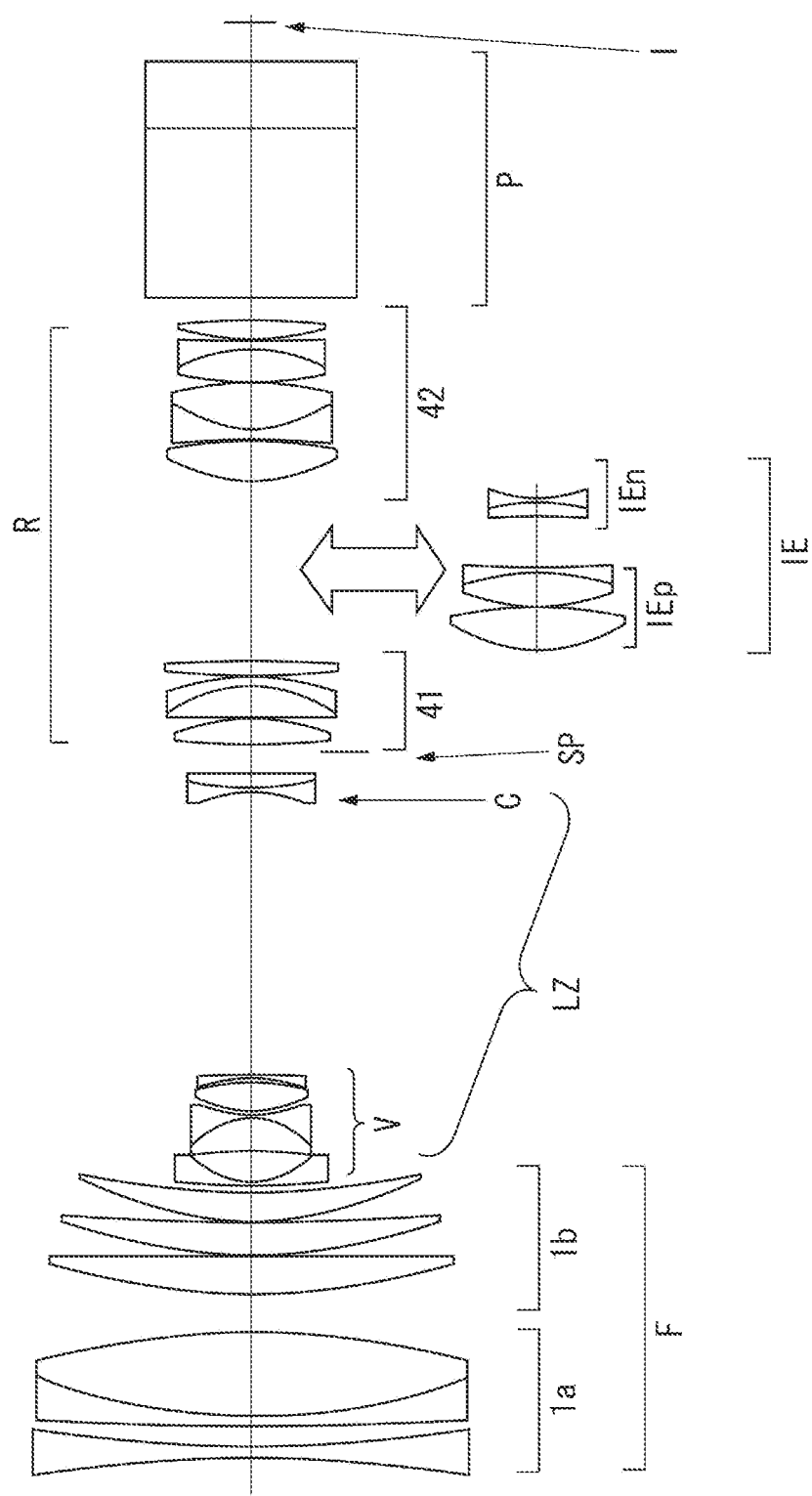
FIG. 7 is a lens cross-sectional view at a wide-angle end of a zoom lens according to a third exemplary embodiment of the present invention.
Figure 8A:
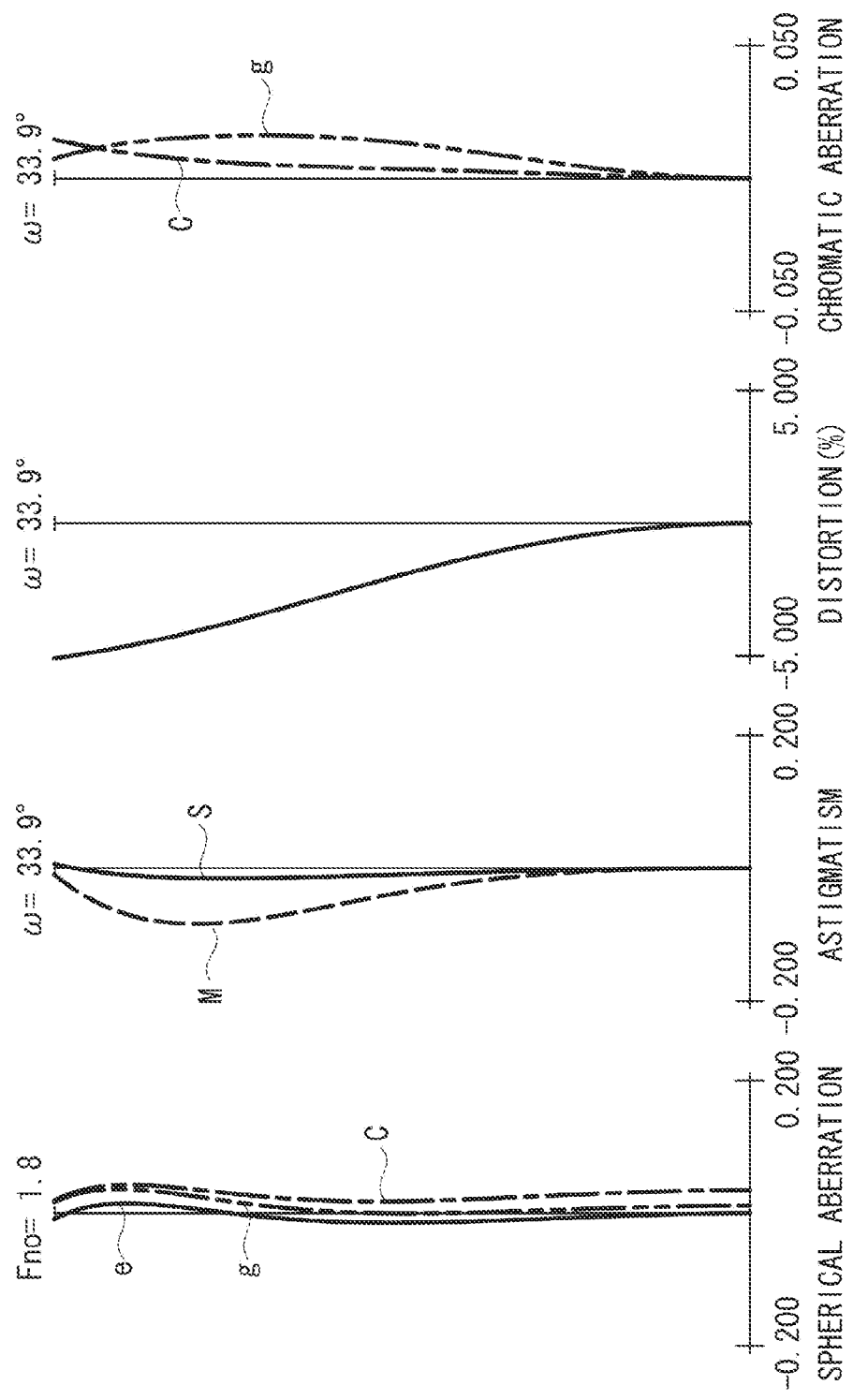
FIGS. 8A and 8B are longitudinal aberration diagrams of the zoom lens at a wide-angle end and a telephoto end, respectively, according to the third exemplary embodiments.
Figure 8B:
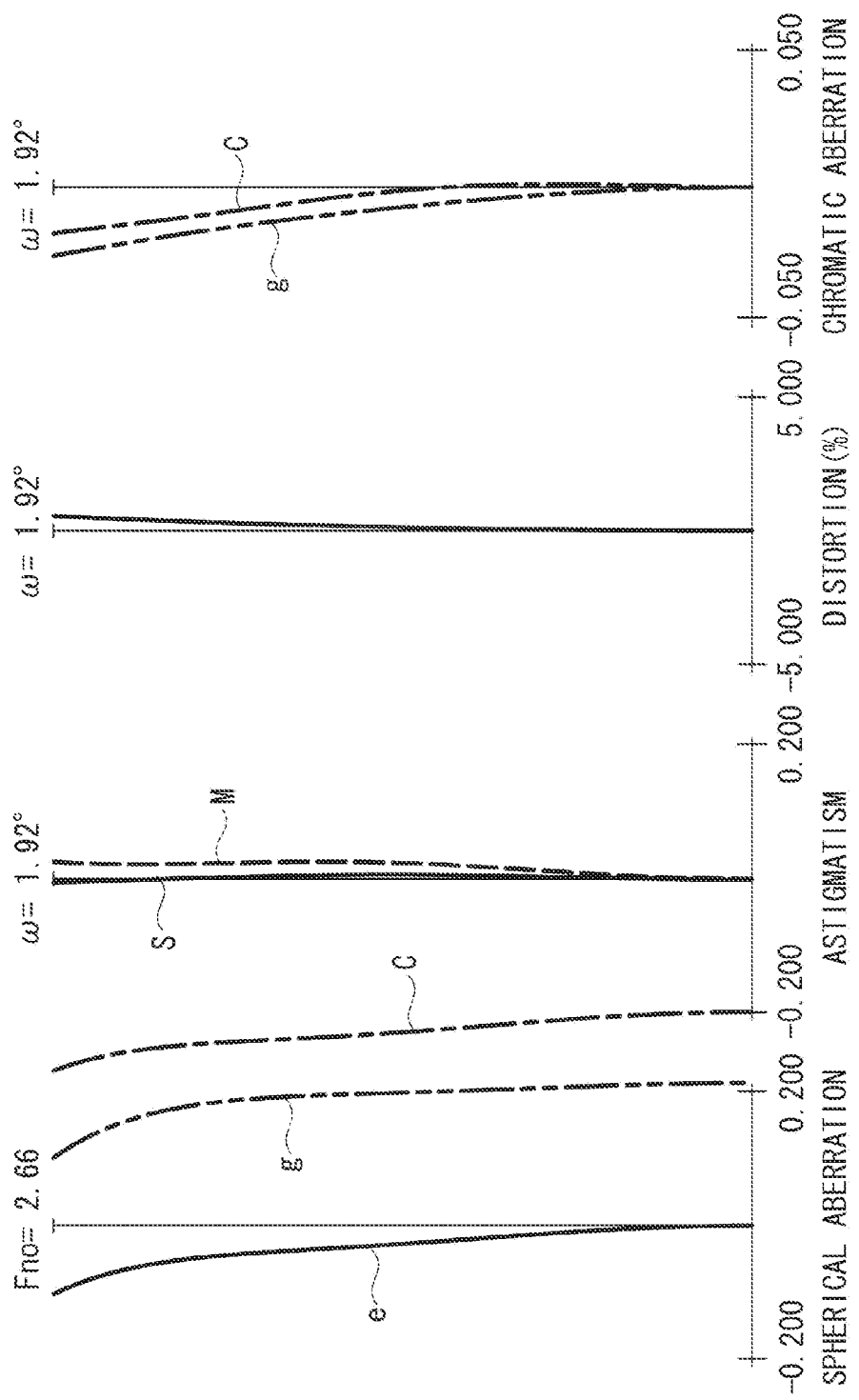
Figure 9A:
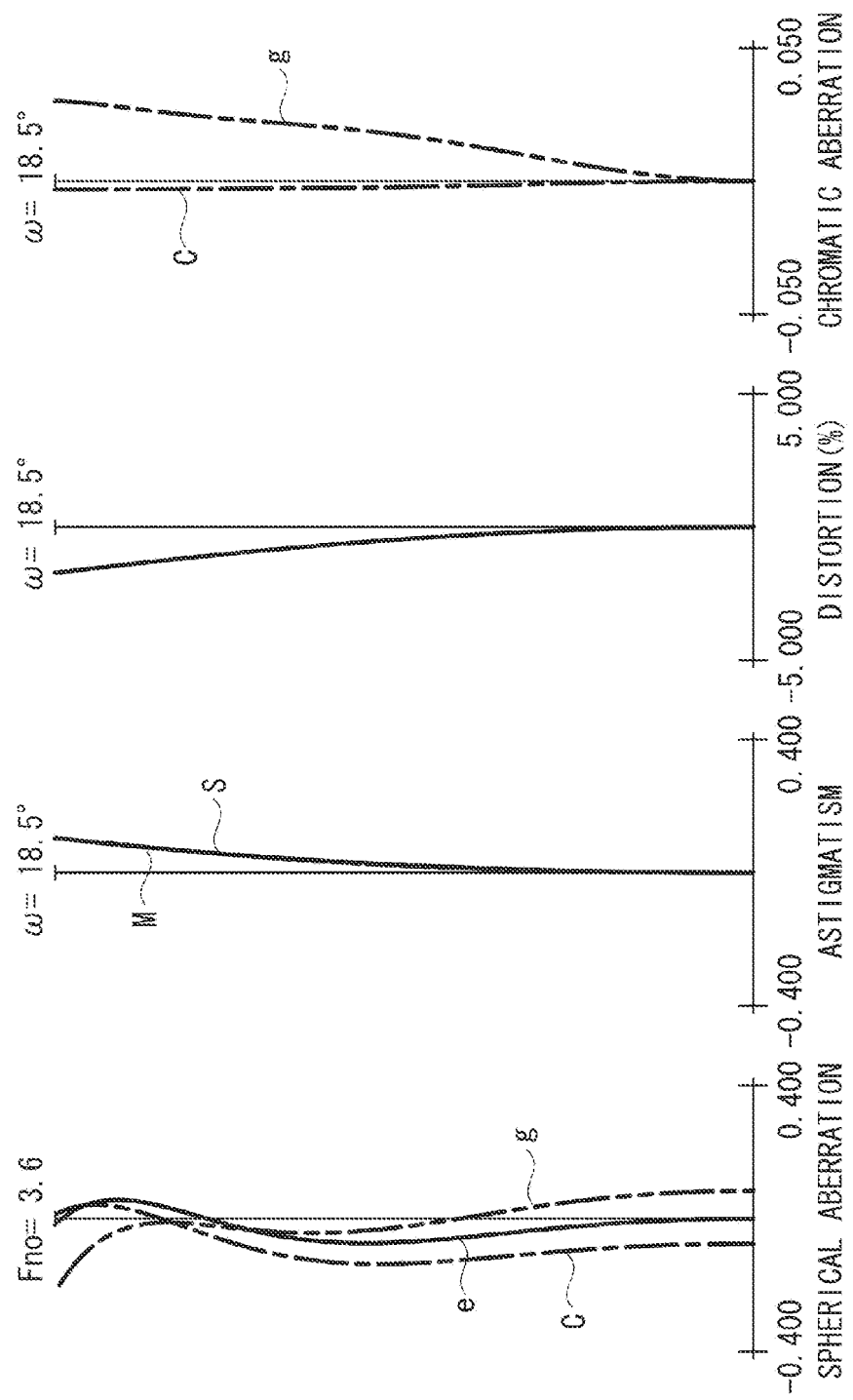
Figure 10:
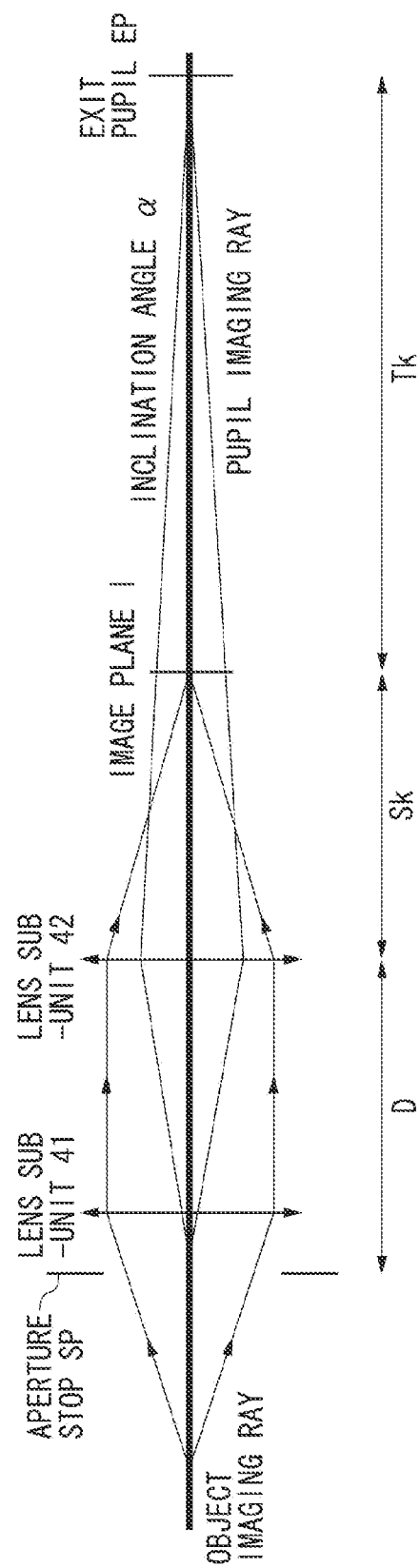
FIG. 10 is a schematic view illustrating a paraxial arrangement of a fourth lens unit.
Figure 11:
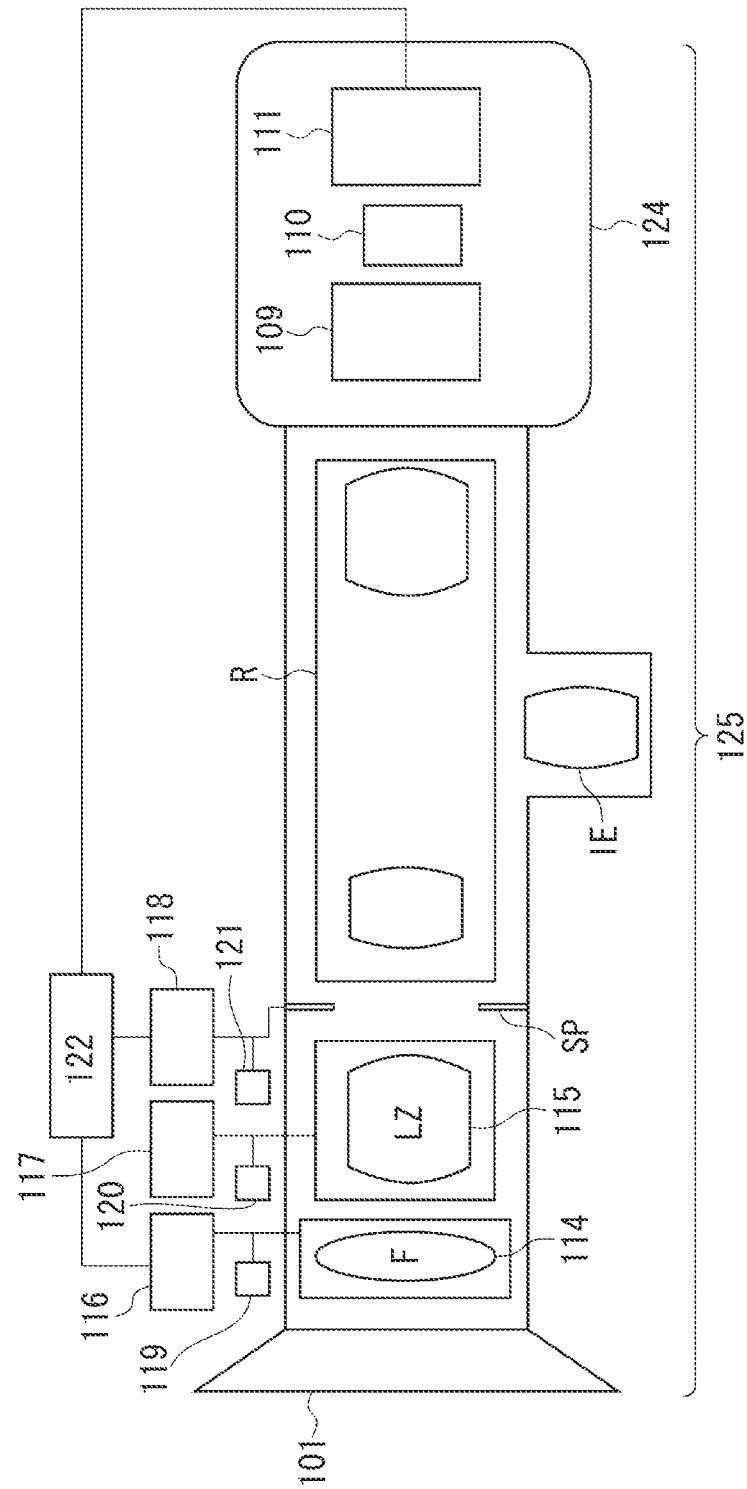
FIG. 11 is a simplified view of an image pickup apparatus according to an exemplary embodiment of the present invention.

FIG. 7 is a lens cross-sectional view at a wide-angle end of a zoom lens according to a third exemplary embodiment of the present invention. FIGS. 8A and 8B are longitudinal aberration diagrams of the zoom lens at a wide-angle end and a telephoto end, respectively, according to the third exemplary embodiments. FIGS. 9A and 9B are longitudinal aberration diagrams of the zoom lens at a wide-angle end and a telephoto end, respectively, according to the third exemplary embodiment, when a focal length conversion optical system is inserted in an optical path. FIG. 10 is a schematic view illustrating a paraxial arrangement of a fourth lens unit. FIG. 11 is a simplified view of an image pickup apparatus according to an exemplary embodiment of the present invention.

In the lens cross-sectional views, an optical path may be defined as the path along the optical axis of the zoom lens that light travels through the various optical units (lens units) from the object plane to the image plane. In the optical path, a first lens unit F (focusing lens unit) has a positive refractive power and does not move for zooming. The first lens unit F performs focusing by moving certain lens elements having a refractive power. A zoom unit LZ includes a lens unit for zooming. The zoom unit LZ includes a second lens unit (variator lens unit) V which has a negative refractive power and which is moved linearly along the optical axis of the zoom lens towards the image side during zooming from a wide-angle end to a telephoto end. The zoom unit LZ further includes a third lens unit (compensator lens unit) C which has a negative refractive power and which is moved nonlinearly toward an object side to compensate for a variation in the position of the image plane caused by variation of magnification. The third lens unit C moves on the optical axis with the movement of the second lens unit during variation of magnification from the wide-angle end to the telephoto end.

An aperture stop SP is disposed on the image side of the third lens unit C. A fourth lens unit R (relay lens unit) for image formation has a positive refractive power and does not move for zooming. The term "does not move for zooming" as used herein is meant to indicate that, for a change in magnification, the fourth lens unit R as whole does not change its longitudinal position with respect to the optical axis, but certain elements may change lateral (perpendicular) positions thereof with respect to the optical path. The fourth lens unit R includes a first lens sub-unit 41, a focal length conversion optical system IE configured to be inserted into or removed from the optical path, and a second lens sub-unit 42. A color separation prism or an optical filter P is illustrated as a glass block on the image side of the fourth lens unit. An image plane I corresponds to an imaging plane of a solid-state image sensor (photoelectric conversion element).

In the longitudinal aberration diagrams, spherical aberration is represented with e-line (solid line), g-line (two-dot chain line), and C-line (one-dot chain line). Astigmatism is represented with a meridional image plane M (dotted line) and a sagittal image plane S (solid line) of e-line. Chromatic aberration of magnification (lateral chromatic aberration) is represented with g-line (two-dot chain line) and C-line (one-dot chain line). Fno denotes F-number, and ω denotes a half angle of view.

In the respective exemplary embodiments, the fourth lens unit R includes the first lens sub-unit 41, the focal length conversion optical system IE configured to be inserted into or removed from the optical path, and the second lens sub-unit 42. In the second lens sub-unit 42, f42 represents a focal length thereof, D is the distance from the aperture stop SP to a lens surface of the second lens sub-unit 42 on the most object side (a lens surface in the second lens sub-unit closest to the object plane), and Fno is the F-number of the entire zoom lens at the wide-angle end. In order to maintain good telecentricity and minimize white shading, at least the following conditions are satisfied:

$$1.04 < f42/D < 1.25 \quad (1)$$

$$Fno \leq 2.0 \quad (2).$$

In the above conditions, the entire zoom lens at the wide-angle end refers to an optical system of the zoom lens in which the focal length conversion optical system IE is removed from the optical path.

The condition (1) defines the ratio of the refractive power of the second lens sub-unit 42 within the fourth lens unit R to the distance from the aperture stop SP to the lens surface on the most object side of the second lens sub-unit 42. The condition (1) is used for reducing white shading when obtaining a color image using a color separation optical system while increasing the absolute value of the distance from the image plane of an exit pupil of the zoom lens.

Next, the technical meaning of the condition (1) will be described. FIG. 10 is a schematic view illustrating a paraxial refractive power arrangement of the fourth lens unit R in the respective exemplary embodiments. In FIG. 10, a back focus of the zoom lens (a distance from the last surface of the second lens subunit 42 to the image plane I) is represented by Sk, and the distance from an image plane I to an exit pupil EP is represented by Tk. In this case, the following approximate equations (a) and (b) are satisfied.

$$\frac{1}{Sk + Tk} = \frac{1}{f42} - \frac{1}{D} \quad (a)$$

$$Tk = \frac{f42}{\left(1 - \frac{f42}{D}\right)} - Sk \quad (b)$$

When an inclination angle of a pupil imaging ray to the exit pupil EP is α, the following condition is satisfied.

$$\alpha \propto 1/Tk \quad (c)$$

Therefore, by increasing the absolute value of the distance Tk from the image plane I to the exit pupil EP, the inclination angle α of the pupil imaging ray to the image plane I can be decreased. As a result, the white shading when obtaining a color image using a color separation optical system can be reduced. Thus, by appropriately setting the value of "f42/D", which is the condition (1) and which is a denominator element on the right side of the equation (b), and increasing the absolute value of the distance Tk on the left side of the equation (b), the white shading can be reduced.

When the ratio becomes smaller than the lower limit of the condition (1), the absolute value of the distance Tk from the image plane I to the exit pupil EP decreases, and the inclination angle α of the pupil imaging ray to the image plane I increases. As a result, it becomes difficult to reduce white shading when obtaining a color image using a color separation optical system. When the ratio becomes greater than the upper limit of the condition (1), an incidence height of an object imaging ray entering the fourth lens unit R increases. As a result, it becomes difficult to decrease the size of the fourth lens unit R. Moreover, when the focal length conversion optical system IE is inserted between the first lens sub-unit 41 and the second lens sub-unit 42, the exit pupil located on the object side becomes closer to the image plane I due to a decrease of the refractive power of the second lens sub-unit 42. As a result, it becomes difficult to reduce white shading.

The condition (2) relates to the F-number of the entire zoom lens at the wide-angle end and is used for reducing the white shading and realizing miniaturization of the entire zoom lens. When the F-number is greater than the upper limit of the condition (2), the incidence height of an object imaging ray entering the fourth lens unit R increases. As a result, it becomes difficult to decrease the size of the fourth lens unit R. More usefully, the numerical range of the condition (1) can be set as follows.

$$1.05 < f42/D < 1.20 \quad (1a)$$

In the respective exemplary embodiments, although satisfactory optical performance is obtained by configuring the zoom lens in the above-described manner, more usefully, at least one of the following conditions (3) to (5) may be satisfied. Specifically, continuing to refer to FIG. 10, an air distance between the first lens sub-unit 41 and the second lens sub-unit 42 is DI. Now, referring back to the cross sectional view of FIG. 1, the first lens sub-unit 41 includes, in order from the object side to the image side, at least one positive lens, and a cemented lens including a positive lens Gr and a negative lens. In this case, a composite focal length of all positive lenses in the zoom lens disposed closer to the object side than the cemented lens is ff, and the focal length of the positive lens Gr is fr. When the focal lengths of the positive lenses disposed closer to the object side than the cemented lens are ff1, ff2, ff3, . . . , ffn in order from the object side, the composite focal length ff is represented as follows: ff=1/(1/ff1+1/ff2+1/ff3 . . . +1/ffn), where "n" is the number of positive lenses in the zoom lens disposed closer to the object side than the cemented lens Gr.

The focal length conversion optical system IE includes a lens unit IEp having a positive refractive power disposed on the object side and a lens unit IEn having a negative refractive power disposed on the image side with the longest air distance disposed therebetween. The focal length of the lens unit IEn is fien. The distance from the aperture stop SP to a lens surface on the most object side of the lens unit IEn is Dien. In this case, at least one of the following conditions can be satisfied.

$$1.55 < f42/DI < 1.85 \quad (3)$$

$$1.3 < ff/fr < 1.8 \quad (4)$$

$$0.47 < |fien/Dien| < 0.60 \quad (5)$$

The condition (3) relates to the ratio of the refractive power of the second lens sub-unit 42 within the fourth lens unit R to the air distance between the first lens sub-unit 41 and the second lens sub-unit 42. The condition (3) is used for reducing the white shading when obtaining a color image using a color separation optical system and making it easy to correct various aberrations. When the ratio is smaller than the lower limit of the condition (3), the absolute value of the distance from the image plane I to the exit pupil decreases, and the inclination angle α of a pupil imaging ray to the image plane increases. As a result, it becomes difficult to reduce the white shading.

When the ratio is greater than the upper limit of the condition (3), the incidence height of an object imaging ray entering the fourth lens unit R increases. As a result, it becomes difficult to decrease the size of the fourth lens unit R. Moreover, the air distance between the first lens sub-unit 41 and the second lens sub-unit 42 decreases. As a result, it becomes difficult to satisfactorily correct various aberrations when the focal length conversion optical system IE is inserted.

The condition (4) is used for reducing the white shading when obtaining a color image using a color separation optical system and satisfactorily correcting various aberrations at the wide-angle end. The condition (4) is associated with Numerical Examples 1 and 2 described below. When the ratio is greater than the upper limit of the condition (4), it becomes difficult to correct various aberrations, particularly, spherical aberration and chromatic aberration, on the wide-angle side. When the ratio is smaller than the lower limit of the condition (4), since the relative position of a principal point of the first lens sub-unit 41 is moved, the distance from the aperture stop SP to the second lens sub-unit 42 increases. As a result, it becomes difficult to reduce the white shading. Moreover, since the entire lens length of the fourth lens unit R increases, it is also not desirable.

The condition (5) defines the ratio of the refractive power of the lens unit IEn disposed on the image side within the focal length conversion optical system IE to the distance from the aperture stop SP to the lens surface on the most object side of the lens unit IEn. The condition (5) is used for reducing the white shading when the focal length conversion optical system IE is inserted between the first lens sub-unit 41 and the second lens sub-unit 42 to displace the focal length of the entire zoom lens toward a long focal length side.

When the ratio is smaller than the lower limit of the condition (5), the absolute value of the distance from the image plane I to the exit pupil when the focal length conversion optical system IE is inserted into the fourth lens unit R decreases, and the inclination angle α of a pupil imaging ray to the image plane increases. As a result, it becomes difficult to reduce the white shading. When the ratio is greater than the upper limit of the condition (5), it becomes difficult to increase a focal length conversion magnification when the focal length conversion optical system IE is inserted into the fourth lens unit R. More usefully, the numerical ranges of the conditions (4) and (5) can be set as follows.

$$1.58 < f42/DI < 1.80 \quad (3a)$$

$$1.40 < ff/fr < 1.75 \quad (4a)$$

$$0.50 < |fien/Dien| < 0.58 \quad (5a)$$

In the respective exemplary embodiments, usefully, the first lens sub-unit 41 can include at least one negative lens and at least two positive lenses. With this configuration, the F-number at the wide-angle end becomes less than 2.0, and it becomes easy to correct various aberrations at the wide-angle end satisfactorily. In particular, when an appropriate number of negative lenses and positive lenses are included, it becomes easy to appropriately correct various aberrations at the wide-angle end while correcting chromatic aberration satisfactorily. Moreover, the first lens sub-unit 41 can include, in order from the object side to the image side, at least one positive lens, a cemented lens including a positive lens and a negative lens, and at least one positive lens.

Since the first lens sub-unit 41 includes an appropriate number of negative lenses and positive lenses, it becomes easy to appropriately correct various aberrations at the wide-angle end. Moreover, since at least one positive lens is included on the image side, the relative position of a principal point of the first lens sub-unit 41 is moved toward the image side, and the distance from the aperture stop SP to the second lens sub-unit 42 can be decreased. As a result, it becomes easy to reduce the white shading when a color separation optical system is used.

As described above, according to the respective exemplary embodiments, the zoom lens has an air distance in which the focal length conversion optical system can be inserted or removed, and the absolute value of the distance from the image plane of the exit pupil is large. Therefore, it is possible to reduce the white shading when obtaining a color image using a color separation optical system.

Next, a lens configuration of the respective exemplary embodiments will be described. In the first exemplary embodiment illustrated in FIG. 1, the first lens unit F has a positive refractive power. A partial system 1*a* (first lens-subunit) is disposed on the most object side within the first lens unit F and does not move for zooming and focusing. A partial system 1*b* (second lens-submit) within the first lens unit F has a positive refractive power and is moved during focusing. The second lens unit V for variation of magnification has a negative refractive power. The second lens unit V performs variation of magnification from the wide-angle end to the telephoto end by moving monotonously on the optical axis toward the image plane. The third lens unit C has a negative refractive power. The third lens unit C moves non-linearly on the optical axis toward the object side during zooming from the wide-angle end to the telephoto end to correct variation of the image plane caused by the variation of magnification.

The second lens unit V and the third lens unit C constitute a variable magnification system LZ. An aperture stop SP is illustrated in FIG. 1. The fourth stationary lens unit R (relay unit) for image formation has a positive refractive power. A partial system 41 (first lens sub-unit) within the fourth lens unit R is located closer to the object side than the focal length conversion optical system IE. A partial system 42 (second lens sub-unit) within the fourth lens unit R is located closer to the image side than the focal length conversion optical system IE. A color separation prism or an optical filter P is illustrated as a glass block in FIG. 1. An image plane I is located on the imaging plane of an image sensor.

The focal length conversion optical system IE increases the focal length of the entire zoom lens with a constant magnification over the entire zoom range by being inserted into an optical path between the partial system 41 and the partial system 42 of the fourth lens unit R. An object-side partial system (lens unit IEp) is represented by IEp and an image-side partial system (lens unit IEn) is represented by IEn when the focal length conversion optical system IE is divided into two lens units with the longest air distance disposed therebetween.

Next, a lens configuration of the fourth lens unit R in the first exemplary embodiment will be described. The object-side partial system 41 within the fourth lens unit R includes, in order from the object side to the image side, a positive lens and a cemented lens including a positive lens and a negative lens. The partial system 42 includes, in order from the object side to the image side, a positive lens, a cemented lens including a positive lens and a negative lens, a cemented lens including a positive lens and a negative lens, and a positive lens. In the present exemplary embodiment, by changing only the partial system 42 with another lens unit, it is possible to change the image height of a zoom lens while maintaining an angle of view and attach the zoom lens to another image pickup apparatus having a different image size.

The zoom lens according to the first exemplary embodiment satisfies all of the conditions (1) to (5) and includes a space for inserting or removing the focal length conversion optical system. An aperture size larger than the F-number of 2.0 is obtained while securing a large absolute value of the distance from the image plane to the exit pupil. Furthermore, various aberrations at the wide-angle end and the telephoto end are corrected satisfactorily, and a high optical performance is obtained.

In the second exemplary embodiment illustrated in FIG. 4, the first lens unit F has a positive refractive power. A partial system 1*a* is disposed on the most object side within the first lens unit F and has a negative refractive power, and does not move for zooming and focusing. A partial system 1*b* within the first lens unit F has a positive refractive power and is moved during focusing. A partial system 1*c* within the first lens unit F has a positive refractive power and does not move for zooming and focusing. The second lens unit V for variation of magnification has a negative refractive power. The second lens unit V performs variation of magnification from the wide-angle end to the telephoto end by moving monotonously on the optical axis toward the image plane. The third lens unit C has a negative refractive power. The third lens unit C moves nonlinearly on the optical axis toward the object side during zooming from the wide-angle end to the telephoto end to compensate for variation of the image plane caused by the variation of magnification.

The second lens unit V and the third lens unit C constitute a variable magnification system LZ. An aperture stop SP is illustrated in FIG. 4. The fourth stationary lens unit R (relay unit) for image formation has a positive refractive power. A partial system 41 (first lens sub-unit) within the fourth lens unit R is located closer to the object side than the focal length conversion optical system IE. A partial system 42 (second lens sub-unit) within the fourth lens unit R is located closer to the image side than the focal length conversion optical system IE. A color separation prism or an optical filter P is illustrated as a glass block in FIG. 4. An image plane I is located on the imaging plane of an image sensor.

The focal length conversion optical system IE increases the focal length of the entire zoom lens with a constant magnification over the entire zoom range by being inserted into an optical path between the partial system 41 and the partial system 42 of the fourth lens unit R. An object-side partial system (lens unit IEp) is represented by IEp and an image-side partial system (lens unit IEn) is represented by IEn when the focal length conversion optical system IE is divided into two lens units with the longest air distance disposed therebetween. The term "longest air distance" as used herein indicates the longest one of air distances (distances between adjacent lenses) within the focal length conversion optical system IE.

Next, a lens configuration of the fourth lens unit R in the second exemplary embodiment will be described. The object-side partial system 41 within the fourth lens unit R includes, in order from the object side to the image side, a positive lens, a positive lens, and a cemented lens including a positive lens and a negative lens. The partial system 42 includes, in order from the object side to the image side, a positive lens, a cemented lens including a negative lens and a positive lens, a cemented lens including a positive lens and a negative lens, and a positive lens. In the present exemplary embodiment, by changing only the partial system 42 with another lens unit, it is possible to change the image height of a zoom lens while maintaining an angle of view and attach the zoom lens to another image pickup apparatus having a different image size.

In the third exemplary embodiment illustrated in FIG. 7, the first lens unit F has a positive refractive power. A partial system 1*a* is disposed on the most object side within the first lens unit F and does not move for zooming and focusing. A partial system 1*b* within the first lens unit F has a positive refractive power and is moved during focusing. The second lens unit V for variation of magnification has a negative refractive power. The second lens unit V performs variation of magnification from the wide-angle end to the telephoto end by moving monotonously on the optical axis toward the image plane. The third lens unit C has a negative refractive power. The third lens unit C moves nonlinearly on the optical axis toward the object side during zooming from the wide-angle end to the telephoto end to compensate for variation of the image plane caused by the variation of magnification.

The second lens unit V and the third lens unit C constitute a variable magnification system LZ. An aperture stop SP is illustrated in FIG. 7. The fourth stationary lens unit R for image formation has a positive refractive power. A partial system 41 (first lens sub-unit) within the fourth lens unit R is located closer to the object side than the focal length conversion optical system IE. A partial system 42 (second lens sub-unit) within the fourth lens unit R is located closer to the image side than the focal length conversion optical system IE. A color separation prism or an optical filter P is illustrated as a glass block in FIG. 7.

An image plane I is located on the imaging plane of an image sensor. The focal length conversion optical system IE, serving as an extender, increases the focal length of the entire zoom lens with a constant magnification over the entire zoom range by being inserted into an optical path between the partial system 41 and the partial system 42 of the fourth lens unit R. An object-side partial system (lens unit IEp) is represented by IEp and an image-side partial system (lens unit IEn) is represented by IEn when the focal length conversion optical system IE is divided into two lens units with the longest air distance disposed therebetween.

Next, a lens configuration of the fourth lens unit R in the third exemplary embodiment will be described. The object-side partial system 41 within the fourth lens unit R includes, in order from the object side to the image side, a positive lens, a cemented lens including a positive lens and a negative lens, and a positive lens. The partial system 42 includes, in order from the object side to the image side, a positive lens, a cemented lens including a negative lens and a positive lens, a cemented lens including a positive lens and a negative lens, and a positive lens. In the present exemplary embodiment, by changing only the partial system 42 with another lens unit, it is possible to change the image height of a zoom lens while maintaining an angle of view and attach the zoom lens to another image pickup apparatus having a different image size.

As described above, according to the respective exemplary embodiments, the zoom lens includes a space for inserting or removing the focal length conversion optical system. An aperture size larger than the F-number of 2.0 is obtained while securing a large absolute value of the distance from the image plane to the exit pupil. Furthermore, various aberrations at the wide-angle end and the telephoto end are corrected satisfactorily, and a high optical performance is obtained.

Hereinafter, Numerical Examples 1 to 3 corresponding to the first to third exemplary embodiments of the present invention will be described. In the respective numerical examples, the order of surfaces from the object side is indicated by i. The radius of curvature of the i-th surface from the object side is represented by ri, the distance between the i-th surface and the (i+1)-th surface from the object side is represented by di, and the refractive index and Abbe number of the i-th optical member are represented by ndi and vdi, respectively. A back focus BF is the distance from the final surface of a glass block to the image plane. The last three surfaces are the surfaces of a glass block such as a filter. Where present, aspherical surfaces are denoted by an asterisk ("*") next to the surface number.

The shape of an aspheric surface is expressed in the coordinates with an X axis in the optical axis direction and an H axis in a direction perpendicular to the optical axis, and the advancing direction of light taken as positive, by the following equation:

$$X = \frac{H^2/R}{1 + \sqrt{1 - (1+k)(H/R)^2}} + A3H^3 + A4H^4 + A5H^5 + \ldots + A12H^{12}$$

where R is the radius of paraxial curvature, k is a conical constant, and A3 to A12 are aspheric coefficients. Herein, the scientific notation "e-Z" is equivalent to the exponential notation "×10$^{-Z}$".

The first surface in Numerical Example 2 is a dummy surface used for lens design. The same is true for the numerical examples of the focal length conversion optical system. The distance from the lens surface on the most image side of the first lens sub-unit 41 when the focal length conversion optical system is disposed within the fourth lens unit R is as follows. The distance is 1.3, 0.7, and 1.5 for Numerical Examples 1, 2, and 3, respectively. Moreover, Table 1 shows numerical values corresponding to the respective conditions in Numerical Examples 1 to 3.

Numerical Example 1

| Surface number | r | d | nd | vd | Effective Diameter |
|---|---|---|---|---|---|
| 1 | −1215.866 | 2.20 | 1.84666 | 23.8 | 78.50 |
| 2 | 108.711 | 6.00 | | | 75.42 |
| 3 | 142.326 | 11.66 | 1.48749 | 70.2 | 75.72 |
| 4 | −195.338 | 7.29 | | | 75.34 |
| 5 | 120.290 | 9.64 | 1.58913 | 61.1 | 72.26 |
| 6 | −239.490 | 0.15 | | | 71.68 |
| 7 | 59.619 | 6.41 | 1.72916 | 54.7 | 62.10 |
| 8 | 131.851 | (Variable) | | | 60.90 |
| 9 | 181.140 | 0.75 | 1.88300 | 40.8 | 25.01 |
| 10 | 15.297 | 4.97 | | | 20.66 |
| 11 | −126.442 | 5.34 | 1.80809 | 22.8 | 20.43 |
| 12 | −15.029 | 0.70 | 1.88300 | 40.8 | 20.16 |
| 13 | 71.177 | 0.14 | | | 19.79 |
| 14 | 25.438 | 3.12 | 1.69895 | 30.1 | 19.97 |
| 15 | 56.384 | (Variable) | | | 19.43 |
| 16 | −30.120 | 1.70 | 1.80610 | 40.9 | 18.13 |
| 17 | 35.770 | 3.25 | 1.84666 | 23.8 | 19.93 |
| 18 | −12743.994 | (Variable) | | | 20.61 |
| 19 (Stop) | ∞ | 3.03 | | | 24.51 |
| 20 | −403.202 | 4.87 | 1.62041 | 60.3 | 26.54 |
| 21 | −37.945 | 0.19 | | | 27.67 |
| 22 | 53.552 | 7.91 | 1.48749 | 70.2 | 28.92 |
| 23 | −28.176 | 2.50 | 1.88300 | 40.8 | 28.89 |
| 24 | −54.394 | 36.50 | | | 29.92 |
| 25 | −80.496 | 5.32 | 1.62588 | 35.7 | 27.68 |
| 26 | −33.779 | 3.00 | | | 28.02 |
| 27 | 716.640 | 7.38 | 1.51742 | 52.4 | 26.15 |
| 28 | −24.244 | 1.20 | 1.88300 | 40.8 | 25.58 |
| 29 | −92.033 | 1.10 | | | 26.04 |
| 30 | 41.242 | 6.97 | 1.49700 | 81.5 | 25.91 |
| 31 | −30.402 | 1.20 | 1.88300 | 40.8 | 25.4 |
| 32 | 72.269 | 0.48 | | | 25.44 |
| 33 | 43.485 | 6.20 | 1.49700 | 81.5 | 25.89 |
| 34 | −38.534 | 4.00 | | | 25.91 |
| 35 | ∞ | 33.00 | 1.60859 | 46.4 | 40.00 |
| 36 | ∞ | 13.20 | 1.51680 | 64.2 | 40.00 |
| 37 | ∞ | (Variable) | | | 40.00 |
| Image plane | ∞ | | | | |

Various Data
Zoom ratio 17.00

| | Wide-angle | Telephoto |
|---|---|---|
| Focal length | 8.50 | 144.50 |
| F-number | 2.00 | 2.43 |
| Angle of view | 32.91 | 2.18 |
| Image height | 5.50 | 5.50 |
| Total lens length | 271.63 | 271.63 |
| BF | 6.78 | 6.78 |
| d 8 | 0.75 | 55.12 |
| d15 | 57.40 | 5.68 |
| d18 | 5.35 | 2.70 |
| d37 | 6.78 | 6.78 |
| Entrance pupil position | 46.3 | 523.07 |
| Exit pupil position | 542.95 | 542.95 |
| Front Principal point position | 54.94 | 706.52 |
| Rear Principal point position | −1.72 | −137.72 |

Zoom lens unit data

| Unit | Leading surface | Focal length | Lens structure length | Front principal point position | Rear principal point position |
|---|---|---|---|---|---|
| 1 | 1 | 73.45 | 43.35 | 29.37 | 1.15 |
| 2 | 9 | −15.40 | 15.01 | 1.45 | −8.65 |
| 3 | 16 | −39.10 | 4.95 | −0.05 | −2.74 |
| 4 | 19 | 54.30 | 138.04 | 59.13 | −121.66 |

Single lens data

| Lens | Leading surface | Focal length |
|---|---|---|
| 1 | 1 | −116.62 |
| 2 | 3 | 170.25 |
| 3 | 5 | 136.75 |
| 4 | 7 | 143.23 |
| 5 | 9 | −18.85 |
| 6 | 11 | 20.45 |
| 7 | 12 | −13.92 |
| 8 | 14 | 63.16 |
| 9 | 16 | −19.94 |
| 10 | 17 | 41.72 |
| 11 | 20 | 66.91 |
| 12 | 22 | 38.98 |
| 13 | 23 | −68.91 |
| 14 | 25 | 88.49 |
| 15 | 27 | 45.27 |
| 16 | 28 | −37.37 |
| 17 | 30 | 36.28 |
| 18 | 31 | −23.96 |
| 19 | 33 | 42.04 |
| 20 | 35 | 0.00 |
| 21 | 36 | 0.00 |

Focal length conversion optical system

| Surface number | r | d | nd | vd | Effective diameter |
|---|---|---|---|---|---|
| 1 | 35.549 | 6.43 | 1.48749 | 70.2 | 29.49 |
| 2 | −70.733 | 0.20 | | | 28.92 |
| 3 | 29.553 | 6.46 | 1.48749 | 70.2 | 25.44 |
| 4 | −53.282 | 0.90 | 1.72047 | 34.7 | 23.58 |
| 5 | 40.710 | 11.54 | | | 21.35 |

-continued

| | | | | |
|---|---|---|---|---|
| 6 | −92.573 | 2.73 | 1.80809 | 22.8 | 15.81 |
| 7 | −33.670 | 0.80 | 1.75500 | 52.3 | 15.39 |
| 8 | 21.566 | (Variable) | | | 14.74 |

Single lens data

| Lens | Leading surface | Focal length |
|---|---|---|
| 1 | 1 | 49.35 |
| 2 | 3 | 39.88 |
| 3 | 4 | −31.69 |
| 4 | 6 | 63.49 |
| 5 | 7 | −17.23 |

When focal length conversion optical system is inserted:

| | Wide-angle | Telephoto |
|---|---|---|
| Focal length | 17.00 | 289.00 |
| F-number | 4.00 | 4.87 |
| Angle of view | 17.93 | 1.09 |
| Image height | 5.50 | 5.50 |
| Total lens length | 271.64 | 271.64 |
| BF | 6.80 | 6.80 |
| Entrance pupil position | 46.30 | 523.07 |
| Exit pupil position | −129.92 | −129.92 |
| Front Principal point position | 61.19 | 201.15 |
| Rear Principal point position | −10.20 | −282.20 |

Numerical Example 2

| Surface number | r | d | nd | vd | Effective diameter |
|---|---|---|---|---|---|
| 1 | ∞ | 0.00 | | | 107.78 |
| 2* | 227.195 | 2.50 | 1.77250 | 49.6 | 87.70 |
| 3 | 33.736 | 19.76 | | | 61.83 |
| 4 | 311.589 | 1.85 | 1.75500 | 52.3 | 61.28 |
| 5 | 80.391 | 13.54 | | | 58.97 |
| 6 | −80.728 | 1.75 | 1.75500 | 52.3 | 58.73 |
| 7 | −17642.010 | 1.30 | | | 60.74 |
| 8 | 135.169 | 6.62 | 1.80518 | 25.4 | 63.25 |
| 9 | −339.711 | 1.16 | | | 63.31 |
| 10 | 328.904 | 9.40 | 1.51633 | 64.1 | 62.99 |
| 11* | −74.094 | 11.86 | | | 62.84 |
| 12 | 1211.778 | 8.57 | 1.48749 | 70.2 | 54.63 |
| 13 | −67.682 | 1.65 | 1.88300 | 40.8 | 54.18 |
| 14 | −126.215 | 0.20 | | | 54.42 |
| 15 | 182.391 | 1.65 | 2.00330 | 28.3 | 52.89 |
| 16 | 55.727 | 10.56 | 1.49700 | 81.5 | 52.39 |
| 17 | −405.898 | 0.20 | | | 53.25 |
| 18 | 130.732 | 9.01 | 1.49700 | 81.5 | 54.61 |
| 19 | −91.216 | 0.20 | | | 54.76 |
| 20 | 57.687 | 7.79 | 1.62041 | 60.3 | 52.65 |
| 21 | 1234.500 | (Variable) | | | 51.79 |
| 22 | 52.721 | 0.75 | 1.88300 | 40.8 | 21.51 |
| 23 | 13.435 | 3.29 | | | 18.24 |
| 24 | 67.192 | 0.75 | 1.88300 | 40.8 | 18.10 |
| 25 | 36.490 | 2.83 | | | 17.67 |
| 26 | −48.656 | 4.75 | 1.80518 | 25.4 | 17.46 |
| 27 | −12.990 | 0.80 | 1.88300 | 40.8 | 17.55 |
| 28 | −1003.160 | 0.20 | | | 18.01 |
| 29 | 33.652 | 2.54 | 1.68893 | 31.1 | 18.31 |
| 30 | 1299.417 | (Variable) | | | 18.15 |
| 31 | −26.243 | 0.75 | 1.75500 | 52.3 | 18.06 |
| 32 | 52.073 | 2.45 | 1.80809 | 22.8 | 19.53 |
| 33 | −173.421 | (Variable) | | | 20.04 |
| 34 (Stop) | ∞ | 1.40 | | | 24.99 |
| 35 | −1438.212 | 3.38 | 1.58913 | 61.1 | 25.86 |
| 36 | −65.000 | 0.20 | | | 26.68 |
| 37 | −301.451 | 3.38 | 1.51742 | 52.4 | 27.18 |
| 38 | −58.843 | 0.20 | | | 27.77 |
| 39 | 217.057 | 6.75 | 1.51823 | 58.9 | 28.19 |
| 40 | −25.621 | 1.20 | 1.88300 | 40.8 | 28.35 |
| 41 | −47.529 | 32.50 | | | 29.32 |
| 42 | 34.035 | 6.83 | 1.51742 | 52.4 | 29.88 |
| 43 | −82.561 | 3.15 | | | 29.23 |
| 44 | 6835.420 | 1.20 | 1.88300 | 40.8 | 26.02 |
| 45 | 22.127 | 7.28 | 1.51823 | 58.9 | 24.26 |
| 46 | −51.213 | 0.24 | | | 23.91 |
| 47 | 109.444 | 5.31 | 1.50127 | 56.5 | 22.76 |
| 48 | −25.177 | 1.20 | 1.90366 | 31.3 | 21.86 |
| 49 | −714.092 | 5.16 | | | 21.55 |
| 50 | 105.373 | 3.62 | 1.51633 | 64.1 | 21.79 |
| 51 | −57.100 | 4.00 | | | 21.70 |
| 52 | ∞ | 33.00 | 1.60859 | 46.4 | 40.00 |
| 53 | ∞ | 13.20 | 1.51680 | 64.2 | 40.00 |
| 54 | ∞ | (Variable) | | | 40.00 |
| Image plane | ∞ | | | | |

Aspherical surface data

2nd Surface

K = −5.42173e+001 A4 = 1.90661e−006
A6 = 3.73103e−011 A8 = −1.91524e−013 A10 = −6.77526e−019
A3 = −4.12872e−006 A5 = −1.32181e−008 A7 = 2.42261e−012
A9 = 2.44378e−015

11th Surface

K = −2.28238e+000 A4 = −2.08837e−007 A6 = 2.96604e−011
A8 = 3.48782e−013 A10 = −1.18721e−016
A3 = −6.36724e−007 A5 = 5.61037e−010 A7 = −1.11164e−011
A9 = −3.18271e−016

Various data
Zoom ratio 13.00

| | Wide-angle | Telephoto |
|---|---|---|
| Focal length | 4.45 | 57.85 |
| F-number | 2.00 | 2.80 |
| Angle of view | 51.02 | 5.43 |
| Image height | 5.50 | 5.50 |
| Total lens length | 319.06 | 319.06 |
| BF | 5.00 | 5.00 |
| d21 | 0.91 | 44.72 |
| d30 | 42.27 | 6.22 |
| d33 | 9.00 | 1.24 |
| d54 | 5.00 | 5.00 |
| Entrance pupil position | 34.85 | 97.66 |
| Exit pupil position | −5166.91 | −5166.91 |
| Front Principal point position | 39.30 | 154.86 |
| Rear Principal point position | 0.55 | −52.85 |

Zoom lens unit data

| Unit | Leading surface | Focal length | Lens structure length | Front principal point position | Rear principal point position |
|---|---|---|---|---|---|
| 1 | 1 | 26.80 | 109.58 | 47.04 | 36.94 |
| 2 | 22 | −16.80 | 15.91 | 0.43 | −11.92 |
| 3 | 31 | −43.80 | 3.20 | −0.39 | −2.18 |
| 4 | 34 | 47.92 | 133.20 | 47.47 | −102.39 |

Single lens data

| Lens | Leading surface | Focal length |
|---|---|---|
| 1 | 1 | −51.33 |
| 2 | 4 | −143.35 |
| 3 | 6 | −106.93 |
| 4 | 8 | 119.74 |
| 5 | 10 | 117.62 |
| 6 | 12 | 131.34 |
| 7 | 13 | −166.53 |
| 8 | 15 | −79.84 |
| 9 | 16 | 99.06 |
| 10 | 18 | 109.27 |
| 11 | 20 | 96.91 |
| 12 | 22 | −20.49 |
| 13 | 24 | −90.96 |

-continued

| | | |
|---|---|---|
| 14 | 26 | 20.58 |
| 15 | 27 | −14.82 |
| 16 | 29 | 49.73 |
| 17 | 31 | −22.91 |
| 18 | 32 | 49.29 |
| 19 | 35 | 115.00 |
| 20 | 37 | 140.00 |
| 21 | 39 | 44.46 |
| 22 | 40 | −64.24 |
| 23 | 42 | 47.31 |
| 24 | 44 | −25.00 |
| 25 | 45 | 30.74 |
| 26 | 47 | 41.21 |
| 27 | 48 | −28.69 |
| 28 | 50 | 72.00 |
| 29 | 52 | 0.00 |
| 30 | 53 | 0.00 |

Focal length conversion optical system

| Surface number | r | d | nd | vd | Effective diameter |
|---|---|---|---|---|---|
| 1 | 37.729 | 6.39 | 1.49700 | 81.5 | 29.41 |
| 2 | −76.089 | 0.20 | | | 28.87 |
| 3 | 27.941 | 5.86 | 1.67790 | 55.3 | 25.87 |
| 4 | −120.567 | 0.90 | 1.80518 | 25.4 | 24.23 |
| 5 | 31.843 | 10.93 | | | 21.80 |
| 6 | −123.476 | 0.99 | 1.88300 | 40.8 | 15.76 |
| 7 | 11.890 | 3.02 | 1.8089 | 22.8 | 14.68 |
| 8 | 27.642 | (Variable) | | | 14.34 |
| Image plane | ∞ | | | | |

Single lens data

| Lens | Leading surface | Focal length |
|---|---|---|
| 1 | 1 | 51.56 |
| 2 | 3 | 33.86 |
| 3 | 4 | −30.92 |
| 4 | 6 | −12.17 |
| 5 | 7 | 23.53 |

When focal length conversion optical system is inserted:

| | Wide-angle | Telephoto |
|---|---|---|
| Focal length | 8.90 | 115.70 |
| F-number | 4.00 | 5.60 |
| Angle of view | 31.72 | 2.72 |
| Image height | 5.50 | 5.50 |
| Total lens length | 319.06 | 319.06 |
| BF | 5.00 | 5.00 |
| Entrance pupil position | 34.85 | 97.66 |
| Exit pupil position | −111.77 | −111.77 |
| Front Principal point position | 43.07 | 98.71 |
| Rear Principal point position | −3.90 | −110.70 |

Numerical Example 3

| Surface number | r | d | nd | vd | Effective diameter |
|---|---|---|---|---|---|
| 1 | −250.166 | 1.80 | 1.74950 | 35.3 | 81.87 |
| 2 | 260.314 | 4.05 | | | 80.71 |
| 3 | 634.876 | 1.80 | 1.80518 | 25.4 | 80.70 |
| 4 | 115.683 | 16.59 | 1.60300 | 65.4 | 80.23 |
| 5 | −165.307 | 7.57 | | | 80.35 |
| 6 | 135.131 | 7.29 | 1.49700 | 81.5 | 77.35 |
| 7 | −3076.056 | 0.15 | | | 76.82 |
| 8 | 103.281 | 6.83 | 1.60300 | 65.4 | 72.70 |
| 9 | 634.581 | 0.15 | | | 71.89 |
| 10 | 71.073 | 5.64 | 1.77250 | 49.6 | 64.72 |
| 11 | 158.452 | (Variable) | | | 63.61 |
| 12* | 228.519 | 0.70 | 1.88300 | 40.8 | 28.60 |
| 13 | 16.094 | 5.93 | | | 23.09 |
| 14 | −123.223 | 6.59 | 1.80518 | 25.4 | 22.85 |
| 15 | −15.129 | 0.70 | 1.75500 | 52.3 | 22.50 |
| 16 | 30.692 | 0.68 | | | 20.62 |
| 17 | 23.413 | 5.61 | 1.60342 | 38.0 | 20.75 |
| 18 | −39.635 | 0.88 | | | 20.17 |
| 19 | −24.853 | 0.70 | 1.83481 | 42.7 | 20.12 |
| 20 | −134.691 | (Variable) | | | 20.09 |
| 21 | −28.312 | 0.70 | 1.74320 | 49.3 | 21.02 |
| 22 | 46.740 | 2.80 | 1.84666 | 23.8 | 23.02 |
| 23 | −2634.956 | (Variable) | | | 23.58 |
| 24 (Stop) | ∞ | 1.30 | | | 27.17 |
| 25 | 260.557 | 5.08 | 1.65844 | 50.9 | 28.55 |
| 26 | −47.039 | 0.15 | | | 29.50 |
| 27 | 2625.907 | 6.19 | 1.51633 | 64.1 | 30.17 |
| 28 | −26.855 | 1.80 | 1.83400 | 37.2 | 30.40 |
| 29 | −52.511 | 0.15 | | | 31.87 |
| 30 | 227.831 | 2.84 | 1.51633 | 64.1 | 32.32 |
| 31 | −207.054 | 35.20 | | | 32.39 |
| 32 | 31.737 | 7.87 | 1.51633 | 64.1 | 31.75 |
| 33 | −79.357 | 0.50 | | | 30.94 |
| 34 | −126.943 | 1.80 | 1.88300 | 40.8 | 29.93 |
| 35 | 26.148 | 8.93 | 1.51742 | 52.4 | 28.29 |
| 36 | −59.290 | 0.15 | | | 28.42 |
| 37 | 63.752 | 6.37 | 1.48749 | 70.2 | 27.75 |
| 38 | −32.186 | 1.80 | 1.88300 | 40.8 | 27.24 |
| 39 | 886.761 | 0.15 | | | 27.18 |
| 40 | 51.628 | 3.76 | 1.51823 | 58.9 | 27.19 |
| 41 | −144.464 | 4.50 | | | 26.95 |
| 42 | ∞ | 33.00 | 1.60859 | 46.4 | 40.00 |
| 43 | ∞ | 13.20 | 1.51633 | 64.2 | 40.00 |
| 44 | ∞ | (Variable) | | | 40.00 |
| Image plane | ∞ | | | | |

Aspherical surface data
12th surface

K = 8.58860e+000 A4 = 7.05382e−006 A6 = −1.80303e−008
A8 = 7.49637e−011 A10 = −8.01854e−013 A12 = 5.80206e−015
A3 = −4.50041e−007 A5 = 1.66019e−008 A7 = −8.87373e−010
A9 = 1.99340e−011 A11 = −1.17115e−013

Various data
Zoom ratio 20.00

| | Wide-angle | Telephoto |
|---|---|---|
| Focal length | 8.20 | 164.00 |
| F-number | 1.80 | 2.66 |
| Angle of view | 33.85 | 1.92 |
| Image height | 5.50 | 5.50 |
| Total lens length | 280.18 | 280.18 |
| BF | 7.65 | 7.65 |
| d11 | 1.01 | 53.39 |
| d20 | 55.23 | 5.98 |
| d23 | 4.40 | 1.28 |
| d44 | 7.65 | 7.65 |
| Entrance pupil position | 50.59 | 622.13 |
| Exit pupil position | 19352.44 | 19352.44 |
| Front Principal point position | 58.80 | 787.52 |
| Rear Principal point position | −0.55 | −156.35 |

Zoom lens unit data

| Unit | Leading surface | Focal length | Lens structure length | Front principal point position | Rear principal point position |
|---|---|---|---|---|---|
| 1 | 1 | 71.00 | 51.87 | 32.66 | 0.80 |
| 2 | 12 | −13.70 | 21.79 | 2.59 | −11.43 |

-continued

| 3 | 21 | −42.20 | 3.50 | −0.07 | −1.98 |
| 4 | 24 | 47.38 | 134.73 | 47.49 | −104.69 |

Single lens data

| Lens | Leading surface | Focal length |
|---|---|---|
| 1 | 1 | −168.82 |
| 2 | 3 | −174.34 |
| 3 | 4 | 115.01 |
| 4 | 6 | 259.89 |
| 5 | 8 | 202.85 |
| 6 | 10 | 161.49 |
| 7 | 12 | −19.52 |
| 8 | 14 | 20.66 |
| 9 | 15 | −13.27 |
| 10 | 17 | 25.08 |
| 11 | 19 | −36.41 |
| 12 | 21 | −23.52 |
| 13 | 22 | 53.74 |
| 14 | 25 | 60.63 |
| 15 | 27 | 51.34 |
| 16 | 28 | −67.66 |
| 17 | 30 | 209.77 |
| 18 | 32 | 44.83 |
| 19 | 34 | −24.28 |
| 20 | 35 | 36.20 |
| 21 | 37 | 44.70 |
| 22 | 38 | −34.94 |
| 23 | 40 | 73.58 |
| 24 | 42 | 0.00 |
| 25 | 43 | 0.00 |

Focal length conversion optical system

| Surface number | r | d | nd | vd | Effective diameter |
|---|---|---|---|---|---|
| 1 | 31.158 | 7.98 | 1.49700 | 81.5 | 32.28 |
| 2 | −80.549 | 0.20 | | | 31.52 |
| 3 | 38.509 | 6.54 | 1.49700 | 81.5 | 27.70 |
| 4 | −44.312 | 0.90 | 1.90366 | 31.3 | 26.00 |
| 5 | 138.652 | 10.04 | | | 24.42 |
| 6 | −202.983 | 2.74 | 1.92286 | 18.9 | 17.38 |
| 7 | −33.198 | 0.80 | 1.88300 | 40.8 | 16.77 |
| 8 | 22.285 | (Variable) | | | 15.62 |
| Image plane | ∞ | | | | |

Single lens data

| Lens | Leading surface | Focal length |
|---|---|---|
| 1 | 1 | 46.17 |
| 2 | 3 | 42.45 |
| 3 | 4 | −36.80 |
| 4 | 6 | 42.15 |
| 5 | 7 | −14.91 |

When focal length conversion optical system is inserted:

| | Wide-angle | Telephoto |
|---|---|---|
| Focal length | 16.40 | 328.00 |
| F-number | 3.60 | 5.32 |
| Angle of view | 18.54 | 0.96 |
| Image height | 5.50 | 5.50 |
| Total lens length | 280.19 | 280.19 |
| BF | 7.66 | 7.66 |
| Entrance pupil position | 50.59 | 622.13 |
| Exit pupil position | −101.86 | −101.86 |
| Front Principal point position | 64.54 | −32.21 |
| Rear Principal point position | −8.74 | −320.34 |

TABLE 1

| Condition Number | Condition | Numerical Example 1 | Numerical Example 2 | Numerical Example 3 |
|---|---|---|---|---|
| (1) | f42/D | 1.06 | 1.16 | 1.07 |
| (2) | Fno | 2.0 | 2.0 | 1.8 |
| (3) | f42/DI | 1.60 | 1.75 | 1.60 |
| (4) | ff/fr | 1.72 | 1.42 | — |
| (5) | |fien/Dien| | 0.52 | 0.55 | 0.52 |

FIG. 11 is a schematic view of an image pickup apparatus (television camera system) in which the zoom lens according to each exemplary embodiment is used as a photographic optical system. In FIG. 11, a zoom lens 101 according to any one of the first to third exemplary embodiments and a camera 124 are provided. The zoom lens 101 is configured to be detachably attached to the camera 124. An image pickup apparatus 125 has a structure in which the zoom lens 101 is attached to the camera 124.

The zoom lens 101 includes a first lens unit F, a magnification varying unit (zoom unit) LZ, and a fourth lens unit (relay unit) R for image formation. The first lens unit F includes a focusing lens unit. The magnification varying unit LZ includes a second lens unit which is moved on the optical axis for variation of magnification and a third lens unit which is moved on the optical axis to compensate for variation of the image plane caused by the variation of magnification. The zoom lens 101 includes an aperture stop SP. The fourth lens unit R includes a focal length conversion optical system IE configured to be inserted into or removed from the optical path. By inserting or removing the focal length conversion optical system IE into or from the optical path, the focal length range of the entire zoom lens of the zoom lens 101 is varied.

Drive mechanisms 114 and 115 such as helicoids or cams drive the first lens unit F and the magnification varying unit LZ, respectively, in the optical axis direction. Motors (drive units) 116 and 117 are provided to drive the drive mechanisms 114 and 115, respectively. A motor (drive unit) 118 is provided to electrically drive the aperture stop SP. Detectors 119 to 121 such as encoders, potentiometers, or photosensors, detect the positions of the first lens unit F and the magnification varying unit LZ on the optical axis and an aperture diameter of the aperture stop SP, respectively.

The camera 124 includes a glass block 109 corresponding to an optical filter or a color separation optical system in the camera 124, and a solid-state image sensor (photoelectric conversion element) 110 such as a CCD sensor or a CMOS sensor, for receiving an object image formed by the zoom lens 101. Moreover, central processing units (CPUs) 111 and 122 perform various drive control operations of the camera 124 and the zoom lens 101, respectively. When the zoom lens according to each exemplary embodiment of the present invention is applied to the television camera described above, an image pickup apparatus having a high optical performance is realized.

According to the exemplary embodiments of the present invention, a zoom lens which is capable of easily obtaining a favorable color image with small white shading before and after a focal length conversion optical system is inserted into an optical path can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-047422 filed Mar. 4, 2011, which is hereby incorporated by reference herein in its entirety.

What is claimed is:

1. A zoom lens comprising, in order from an object side to an image side:
   a first lens unit having a positive refractive power, which does not move for zooming;
   a second lens unit having a negative refractive power, which moves during zooming;
   a third lens unit having a negative refractive power, which moves during zooming;
   an aperture stop; and
   a fourth lens unit having a positive refractive power, which does not move for zooming,
   wherein the fourth lens unit includes a first lens sub-unit, a focal length conversion optical system configured to be inserted into or removed from an optical path, and a second lens sub-unit, and
   wherein the following conditions are satisfied:

$$1.04 < f42/D < 1.25$$

$$Fno \leq 2.0$$

where f42 is a focal length of the second lens sub-unit, D is a distance from the aperture stop to a lens surface at the most object side of the second lens sub-unit, and Fno is an F-number of the entire zoom lens at a wide-angle end when the focal length conversion optical system is removed from the optical path.

2. The zoom lens according to claim 1, wherein the following condition is satisfied:

$$1.55 < f42/DI < 1.85$$

where DI is an air distance between the first lens sub-unit and the second lens sub-unit.

3. The zoom lens according to claim 1, wherein the first lens sub-unit includes at least one negative lens and at least two positive lenses.

4. The zoom lens according to claim 1, wherein the first lens sub-unit includes, from the object side to the image side, at least one positive lens and a cemented lens including a positive lens Gr and a negative lens, and
   wherein the following condition is satisfied:

$$1.3 < ff/fr < 1.8$$

where ff is a composite focal length of all positive lenses in the zoom lens disposed closer to the object side than the cemented lens, fr is a focal length of the positive lens Gr, and when focal lengths of the positive lenses disposed closer to the object side than the cemented lens are ff1, ff2, ff3, ffn in order from the object side, the composite focal length is represented by the following equation: $ff = 1/(1/ff1 + 1/ff2 + 1/ff3 \ldots + 1/ffn)$, where n is the number of positive lenses disposed closer to the object side than the cemented lens.

5. The zoom lens according to claim 1, wherein the first lens sub-unit includes, in order from the object side to the image side, at least one positive lens, a cemented lens including a positive lens and a negative lens, and at least one positive lens.

6. The zoom lens according to claim 1, wherein the focal length conversion optical system includes a lens unit IEp having a positive refractive power disposed on the object side and a lens unit IEn having a negative refractive power disposed on the image side, an air distance between the lens unit IEp and the lens unit IEn being longest among air distances within the focal length conversion optical system, and
   wherein the following condition is satisfied:

$$0.47 < |fien/Dien| < 0.60$$

where fien is a focal length of the lens unit IEn, and Dien is a distance from the aperture stop to a lens surface on the most object side of the lens unit IEn when the focal length conversion optical system is disposed in the optical path.

7. An image pickup apparatus comprising:
   a zoom lens; and
   a solid-state image sensor configured to receive an image formed by the zoom lens,
   wherein the zoom lens includes, in order from an object side to the solid-state image sensor:
   a first lens unit having a positive refractive power, which does not move for zooming;
   a second lens unit having a negative refractive power, which moves during zooming;
   a third lens unit having a negative refractive power, which moves during zooming;
   an aperture stop; and
   a fourth lens unit having a positive refractive power, which does not move for zooming,
   wherein the fourth lens unit includes a first lens sub-unit, a focal length conversion optical system configured to be inserted into or removed from an optical path, and a second lens sub-unit, and
   wherein the following conditions are satisfied:

$$1.04 < f42/D < 1.25; \text{ and}$$

$$Fno \leq 2.0$$

where f42 is a focal length of the second lens sub-unit, D is a distance from the aperture stop to a lens surface at the most object side of the second lens sub-unit, and Fno is an F-number of the entire zoom lens at a wide-angle end when the focal length conversion optical system is removed from the optical path.

* * * * *